Jan. 2, 1962 H. GANG 3,015,436
DIVISION MECHANISM FOR LISTING CALCULATOR
Filed May 10, 1957 19 Sheets-Sheet 1

INVENTOR
HERMAN GANG
BY
George V. Hall
ATTORNEY

Jan. 2, 1962 H. GANG 3,015,436
DIVISION MECHANISM FOR LISTING CALCULATOR
Filed May 10, 1957 19 Sheets-Sheet 3

INVENTOR
HERMAN GANG
BY
ATTORNEY

Jan. 2, 1962   H. GANG   3,015,436
DIVISION MECHANISM FOR LISTING CALCULATOR
Filed May 10, 1957   19 Sheets-Sheet 6

INVENTOR.
HERMAN GANG
BY
George V. Hall
ATTORNEY

Jan. 2, 1962          H. GANG          3,015,436

DIVISION MECHANISM FOR LISTING CALCULATOR

Filed May 10, 1957          19 Sheets-Sheet 7

INVENTOR.
HERMAN GANG

BY

*George J. Hall*
ATTORNEY

Jan. 2, 1962  H. GANG  3,015,436
DIVISION MECHANISM FOR LISTING CALCULATOR
Filed May 10, 1957 19 Sheets-Sheet 8

INVENTOR.
HERMAN GANG
BY
ATTORNEY

INVENTOR.
HERMAN GANG

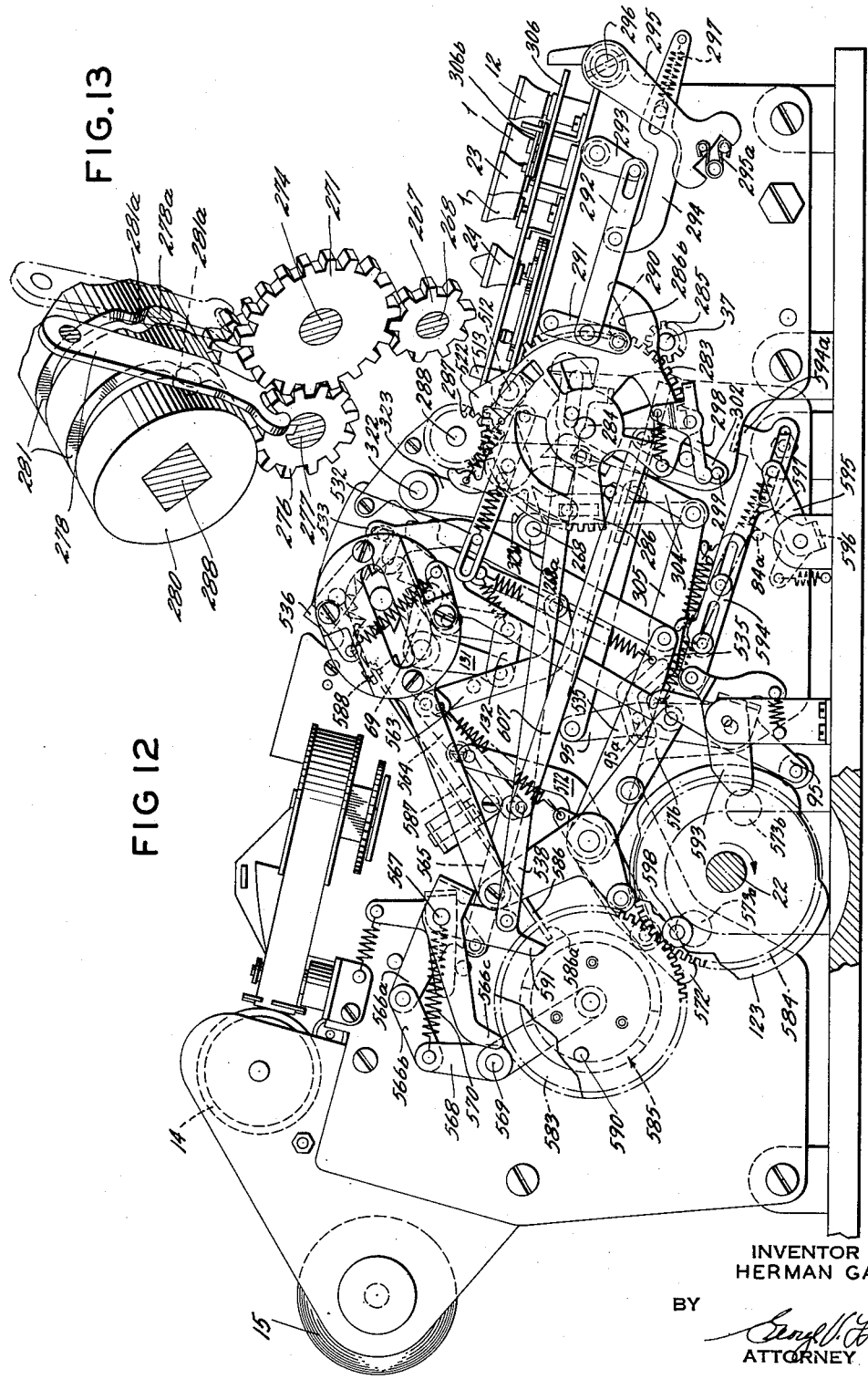

Jan. 2, 1962 H. GANG 3,015,436
DIVISION MECHANISM FOR LISTING CALCULATOR
Filed May 10, 1957 19 Sheets-Sheet 11

INVENTOR
HERMAN GANG
BY
George U. Hall
ATTORNEY

Jan. 2, 1962 H. GANG 3,015,436
DIVISION MECHANISM FOR LISTING CALCULATOR
Filed May 10, 1957 19 Sheets-Sheet 12

INVENTOR.
HERMAN GANG
BY
George V. Hall
ATTORNEY

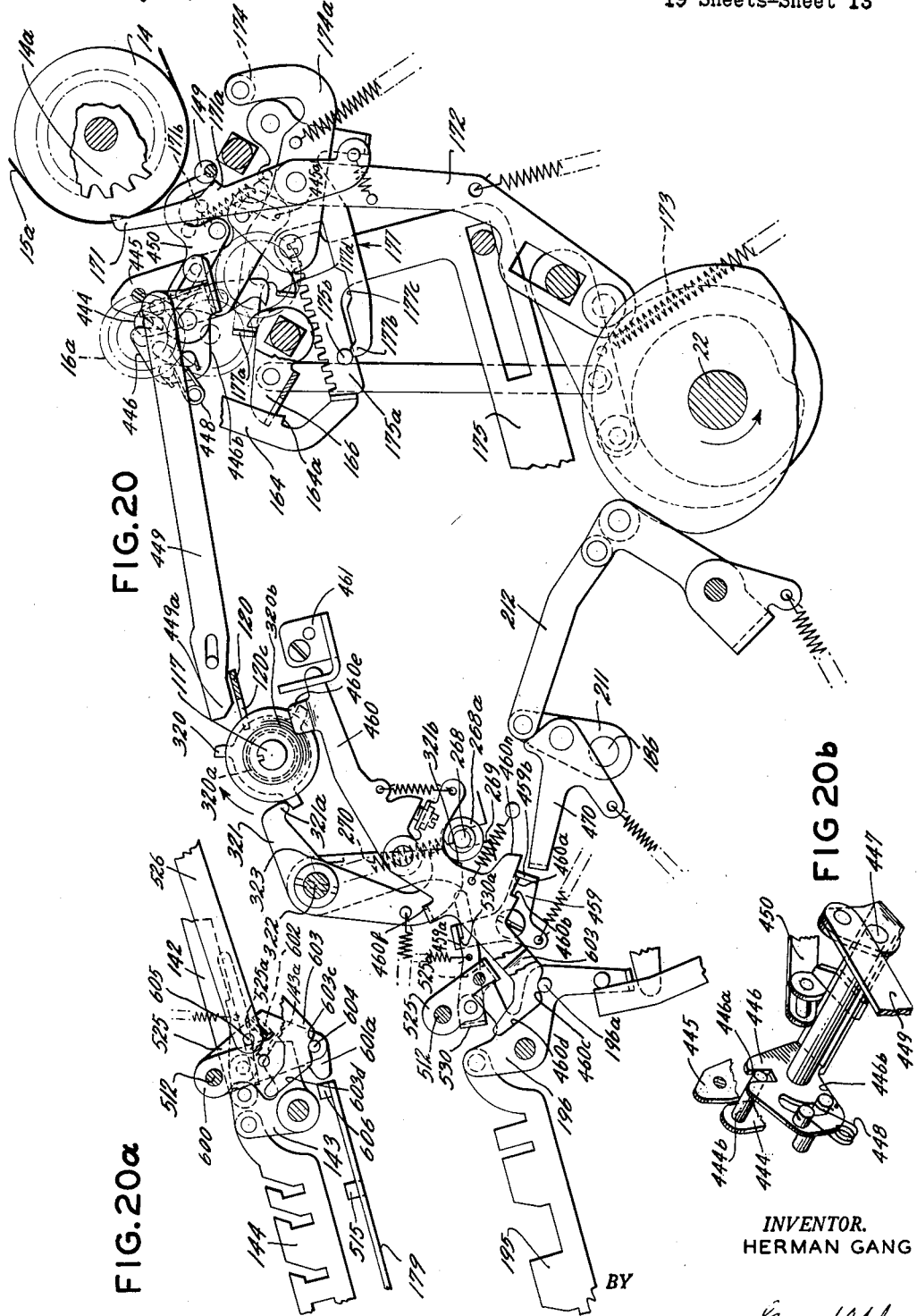

Jan. 2, 1962             H. GANG             3,015,436
DIVISION MECHANISM FOR LISTING CALCULATOR
Filed May 10, 1957             19 Sheets-Sheet 14
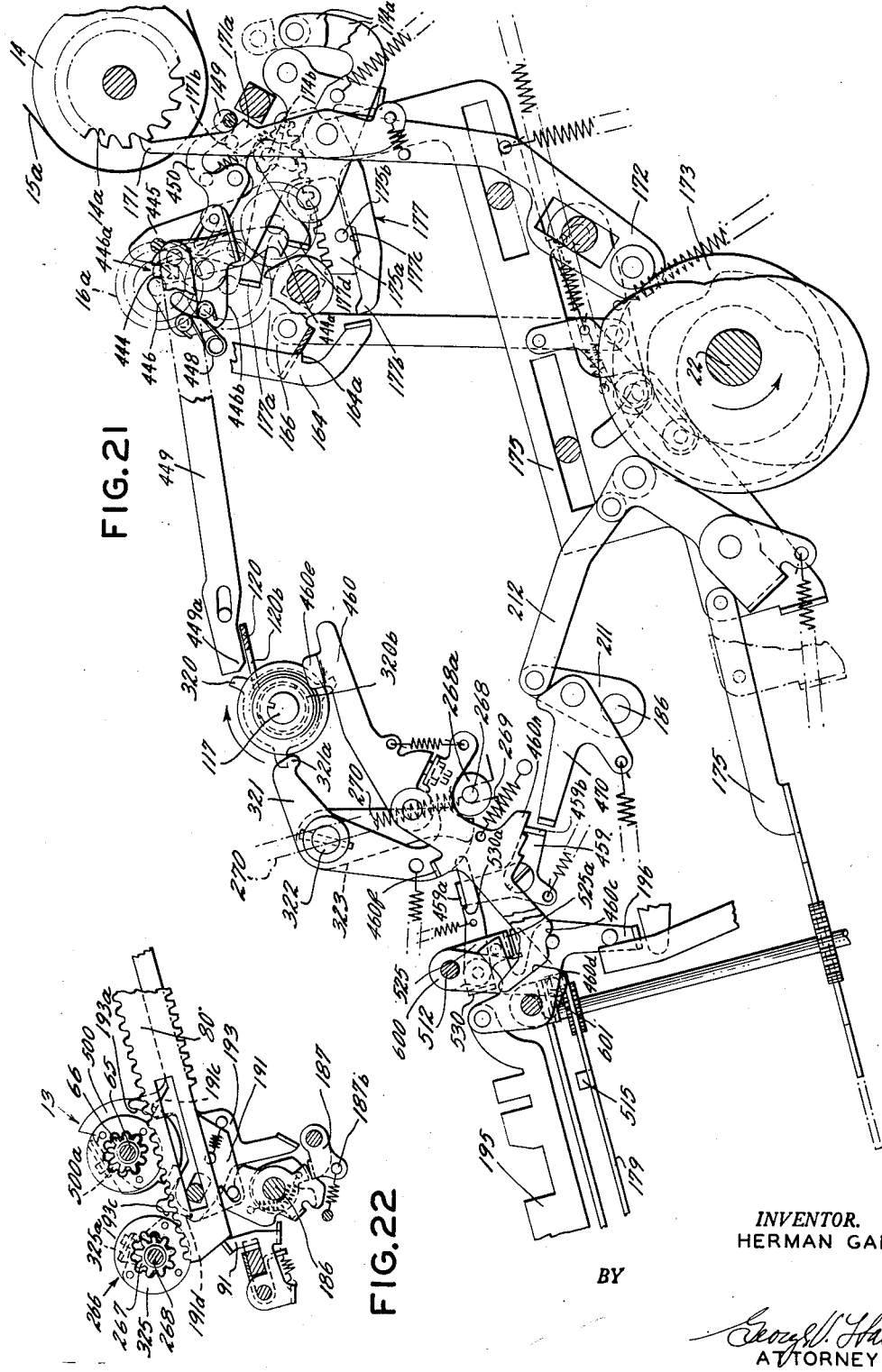
INVENTOR.
HERMAN GANG
BY
*George W. Hall*
ATTORNEY

INVENTOR.
HERMAN GANG

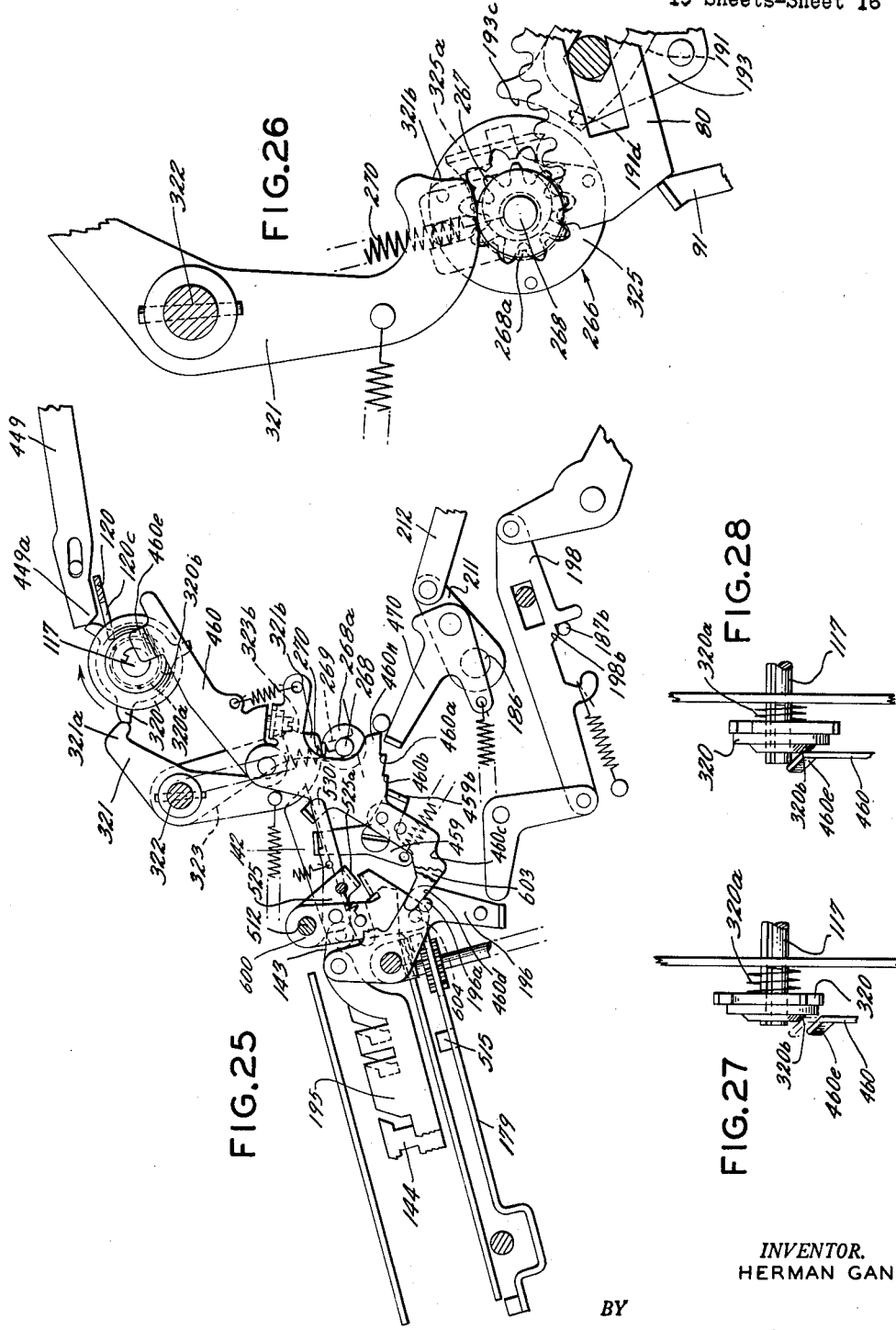
Jan. 2, 1962  H. GANG  3,015,436
DIVISION MECHANISM FOR LISTING CALCULATOR
Filed May 10, 1957  19 Sheets-Sheet 16
INVENTOR.
HERMAN GANG
BY
ATTORNEY

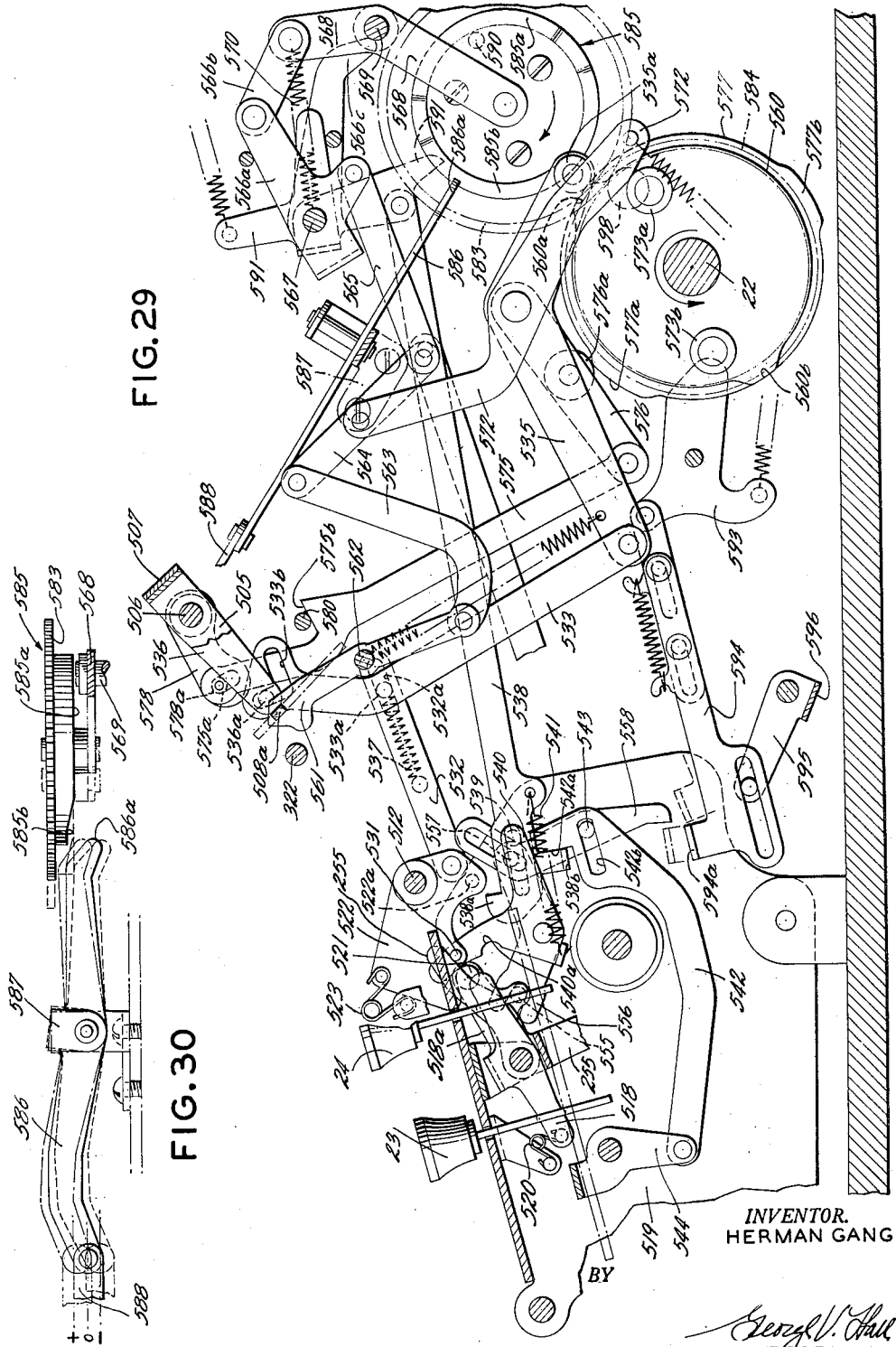

Jan. 2, 1962            H. GANG            3,015,436
DIVISION MECHANISM FOR LISTING CALCULATOR
Filed May 10, 1957            19 Sheets-Sheet 18
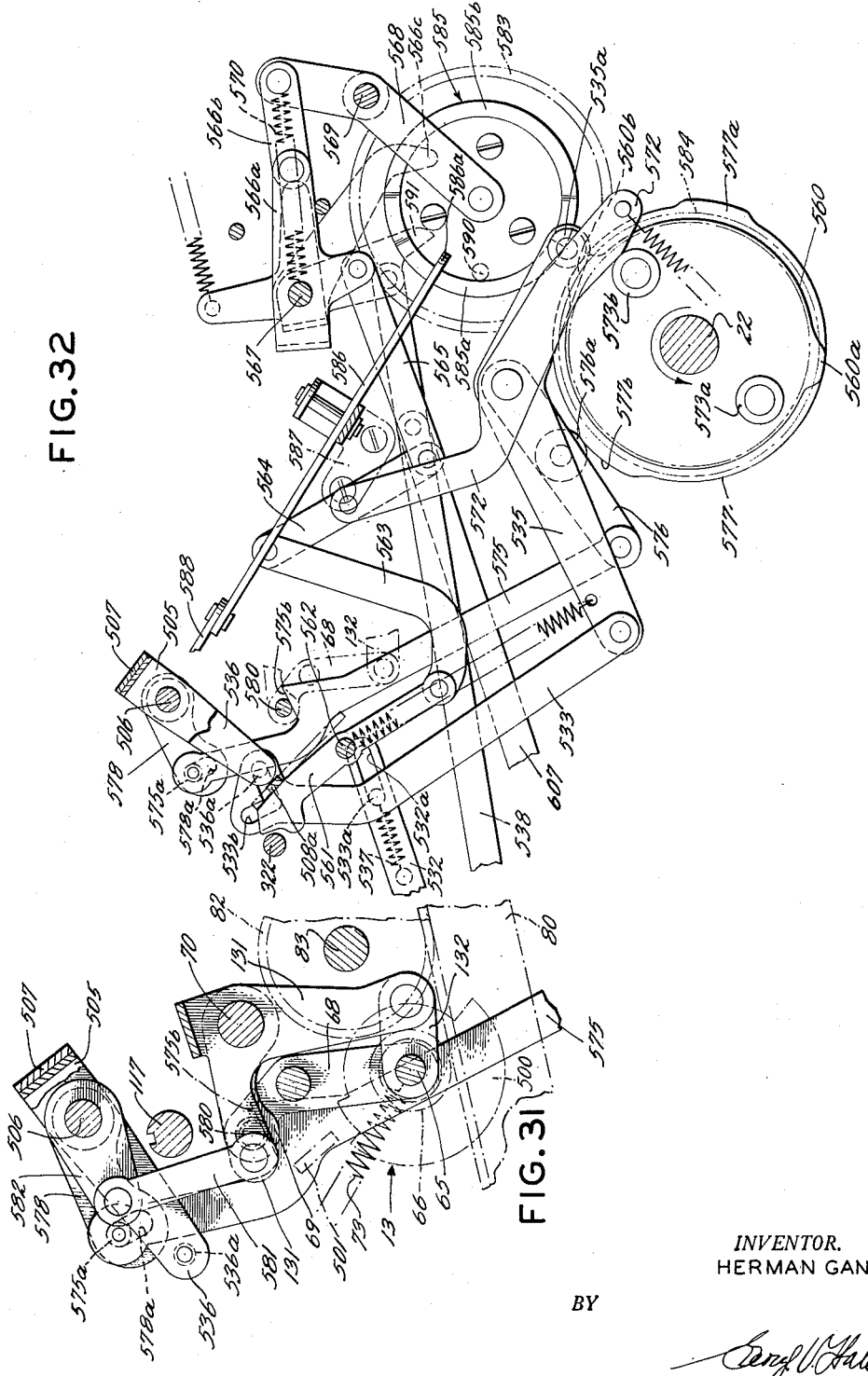
INVENTOR.
HERMAN GANG
BY
ATTORNEY United States Patent Office 3,015,436
Patented Jan. 2, 1962

3,015,436
DIVISION MECHANISM FOR LISTING CALCULATOR
Herman Gang, Morris Plains, N.J., assignor to Monroe Calculating Machine Company, Orange, N.J., a corporation of Delaware
Filed May 10, 1957, Ser. No. 658,353
10 Claims. (Cl. 235—60)

This invention relates to division mechanism, and more particularly to such mechanism adapted to control adding subtracting listing type machines wherein registration is effected by reciprocatory rack type actuating means. Division control mechanism has been embodied in prior art machines of this type. In these machines, the actuator racks are effective during either the initial or the return stroke of each cycle of operation depending on the sign of registration, and are moved idly during the opposed stroke. During the initial stroke of the racks, the type members are moved to printing line position and then restored during the return stroke. The calculating speed of these prior art printing calculators is much slower than calculators having rotary type actuating means. This is primarily due to the relatively low speed of operation to which the reciprocatory actuator rack drive is inherently restricted.

It is therefore the primary object of the present invention to provide division control mechanism which will effect relatively high calculating speed in a machine having reciprocatory actuating means for the registering mechanism.

A further object of the invention is to provide improved control mechanism which will control the printing mechanism to print the dividend, divisor, quotient and remainder in a most desirable relative position.

The machine in which the devices of the invention are herein disclosed is an adding-subtracting listing machine of the type fully disclosed in applicant's co-pending application, Serial No. 618,230, filed on October 25, 1956, now Patent No. 2,970,755. As fully disclosed in this application, the machine is adapted to perform the usual functions of an adding-subtracting listing machine. In this machine, the actuator racks of the registering mechanism are effective, in the usual manner, during one stroke and idle during the opposed stroke of each cycle of additive and subtractive registration. However, in certain other of the machine operations, the registering mechanism is rendered operable to effect a complete registering operation on both the initial and return strokes (hereinafter termed double stroke registration to distinguish from single stroke) of each cycle of operation.

Applicant's co-pending application Ser. No. 618,231, filed on October 25, 1956, now Patent No. 2,970,754, fully discloses mechanism to control the listing machine in which the devices of the present invention are embodied in a program of multiplication utilizing the above noted double stroke registration. Reference is made to this application together with the afore-noted application, Serial No. 618,230 for a complete disclosure of mechanisms and operations referred to but not described in detail in the present application.

The present invention utilizes the double stroke registration in the program of division. The accumulator register of the machine is of the crawl transfer type and sign detection means for this type of register disclosed in applicant's co-pending application, Serial No. 472,593, filed on December 2, 1954, now abandoned, is utilized in the program of division. As a result, the calculating speed is greatly increased without increasing the cycling speed.

The machine is of the ten-key type wherein values are entered into a pin carriage in the usual manner upon successive depression of digital value keys 0 to 9. The dividend is entered in the pin carriage after which a plus bar is depressed to enter the value into the accumulator, at which time the value is also printed. Next, the divisor is entered into the pin caraige and the division operation is initiated in response to depression of a dividend key.

During the first subtractive cycle of operation of the division program, the divisor is printed and then the printing mechanism is disabled until quotient registration is completed. Registration is automatically terminated at the end of quotient registration or in response to depression of a stop key, and then a total taking operation will be effective to first take a total from the counter register to print the quotient and then take a total from the accumulator register to print the remainder, if any.

In the following description with reference to the accompanying drawings parts equivalent to those of said applications, Serial Nos. 618,230 and 618,231 are given the same reference numbers insofar as practical.

In the drawings:

FIG. 12 is a left side elevation of the machine.

FIG. 13 is a fragmentary rear perspective of the devices for controlling operation of the counter register actuating mechanism.

FIG. 20 is a right side elevation of details of the printing control mechanism with the parts in normal position and associated total taking control means.

FIG. 20a is a fragmentary side view of the add-subtract slide.

FIG. 20b is a fragmentary perspective of the printing control mechanism.

FIG. 21 is a right side elevation similar to FIG. 20 with the parts in an operated position.

FIG. 22 is a fragmentary right side view of the total taking mechanism in normal position.

FIG. 23, FIG. 24, FIG. 25, and FIG. 26 are detailed right side elevations of parts shown in FIG. 20 in various operated positions.

FIGS. 27, 28 are fragmentary detail views of the counter register adjusting means.

FIG. 29 is a side elevation looking toward the left from the main left side frame with said frame removed and with the divide key depressed to initiate a division operation.

FIG. 30 is a detail view taken on line 30—30 of FIG. 29.

FIG. 31 is a detail right side elevation of the means for restraining the accumulator against movement during a sensing operation.

FIG. 32 is a fragmentary detail view of the overdraft sensing means of FIG. 29 in an operated position.

Figure 33:
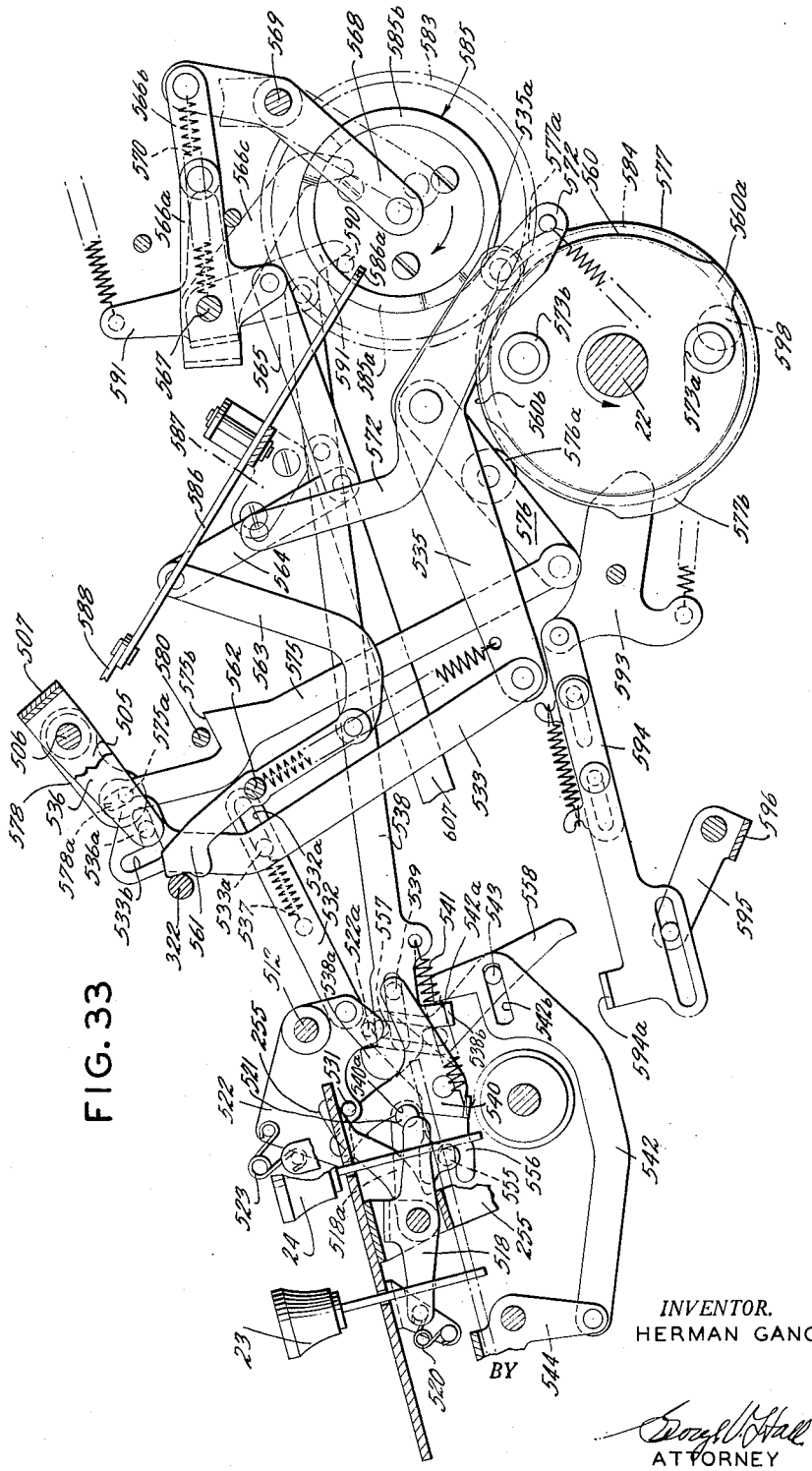

FIG. 33 is a detail view of the parts of FIGS. 29–32 in an operated position with the stop key depressed.

GENERAL ARRANGEMENT

The machine has, at its front, a keyboard (FIGS. 1, 2, 3, 6) including the usual grouping of numeral keys 1 of the digital values 0 to 9 inclusive for controlling entry of selected values into a conventional type pin carriage 2 which is located beneath the keyboard. The usual control keys are located at either side of the numeral keys. The control keys include an add key 3, a subtract key 4, a correction key 5, a total key 6, a subtotal key 7, a non-add key 8, a decimal key 9, a shift key 10, a key 11 which selectively controls a repeat or a constant factor operation, a back space key 12, a division key 23, and a division stop key 24. At the extreme right of the keyboard is a grouping of multiplier keys 265 of the digital values 0 to 9.

Figure 10:
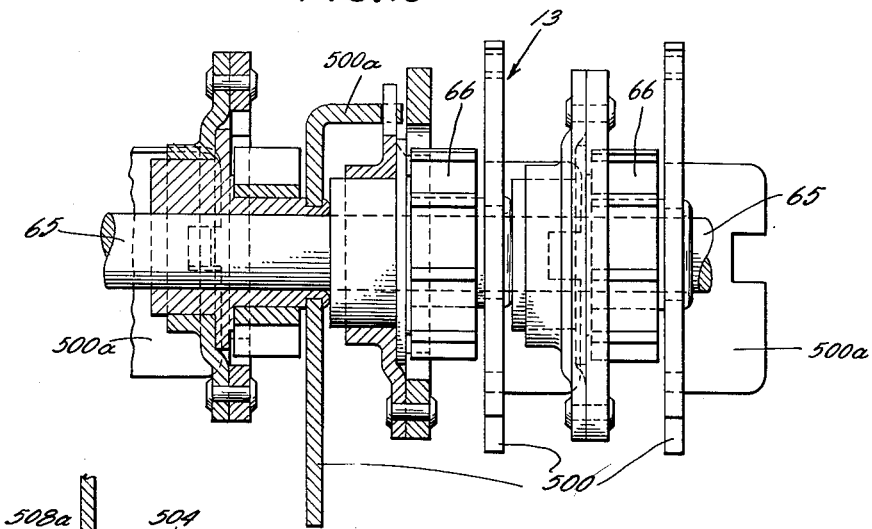
FIG. 10 is a view partly in section of several orders of the crawl tens transfer accumulator and the stepped control plates of the overdraft detecting mechanism driven thereby.

A crawl tens transfer type accumulator register designated generally by the reference numeral 13 (FIGS. 1, 3, 10) extends transversely of the machine and is operated by rack type actuating mechanism, the excursions of which are controlled in accordance with values entered in the pin carriage.

A crawl tens transfer type counter register designated generally by the reference numeral 266 (FIGS. 1, 3) extends transversely of the machine forwardly of accumulator 13. Drive means, hereinafter described, is operable to effect a single count in counter register 266 for each effective stroke of the actuating mechanism of accumulator 13 in a division program thereby registering the quotient.

Figure 1:
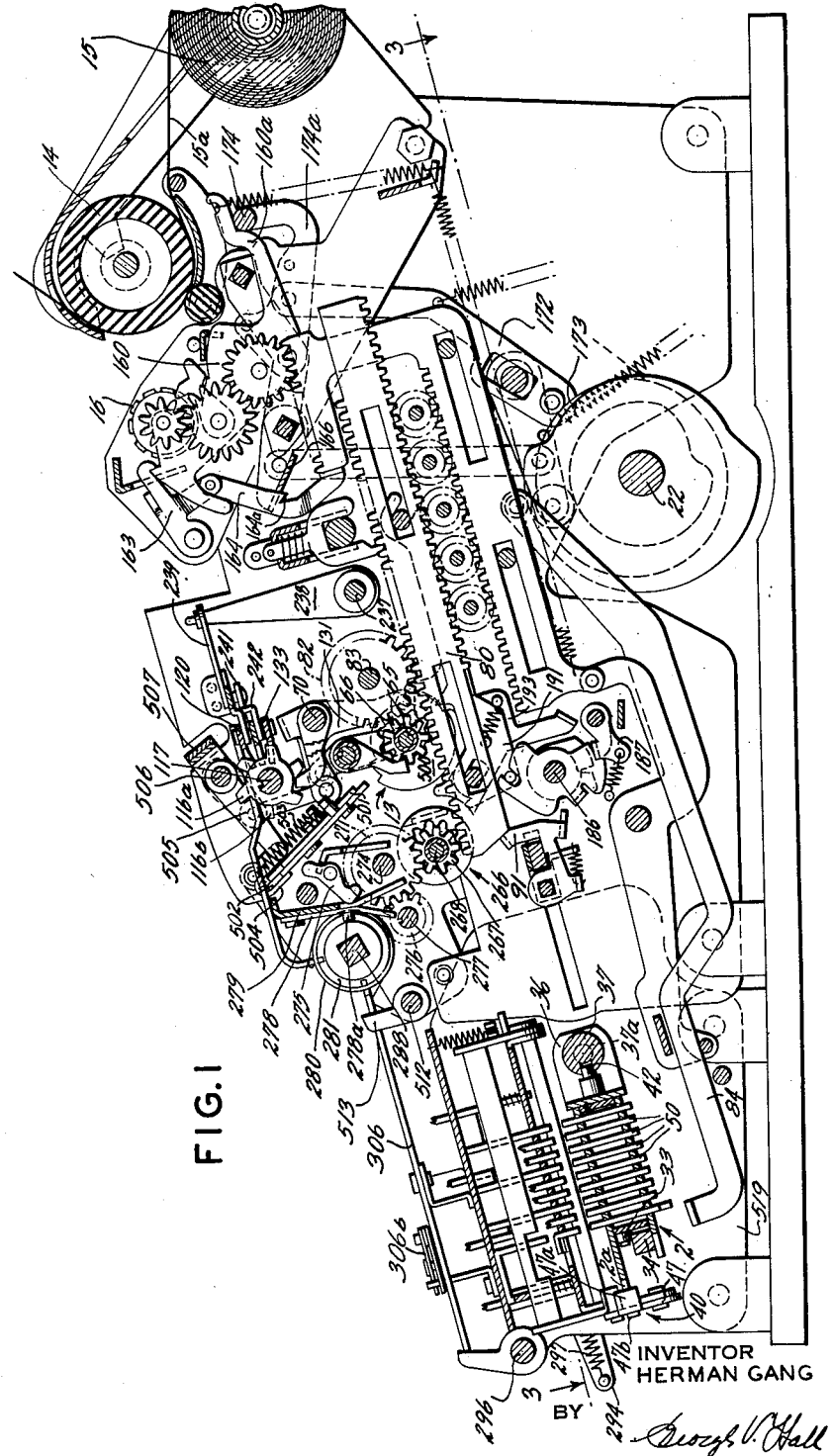
FIG. 1 is a longitudinal section through the machine showing the registering and printing mechanism.
Figure 2:
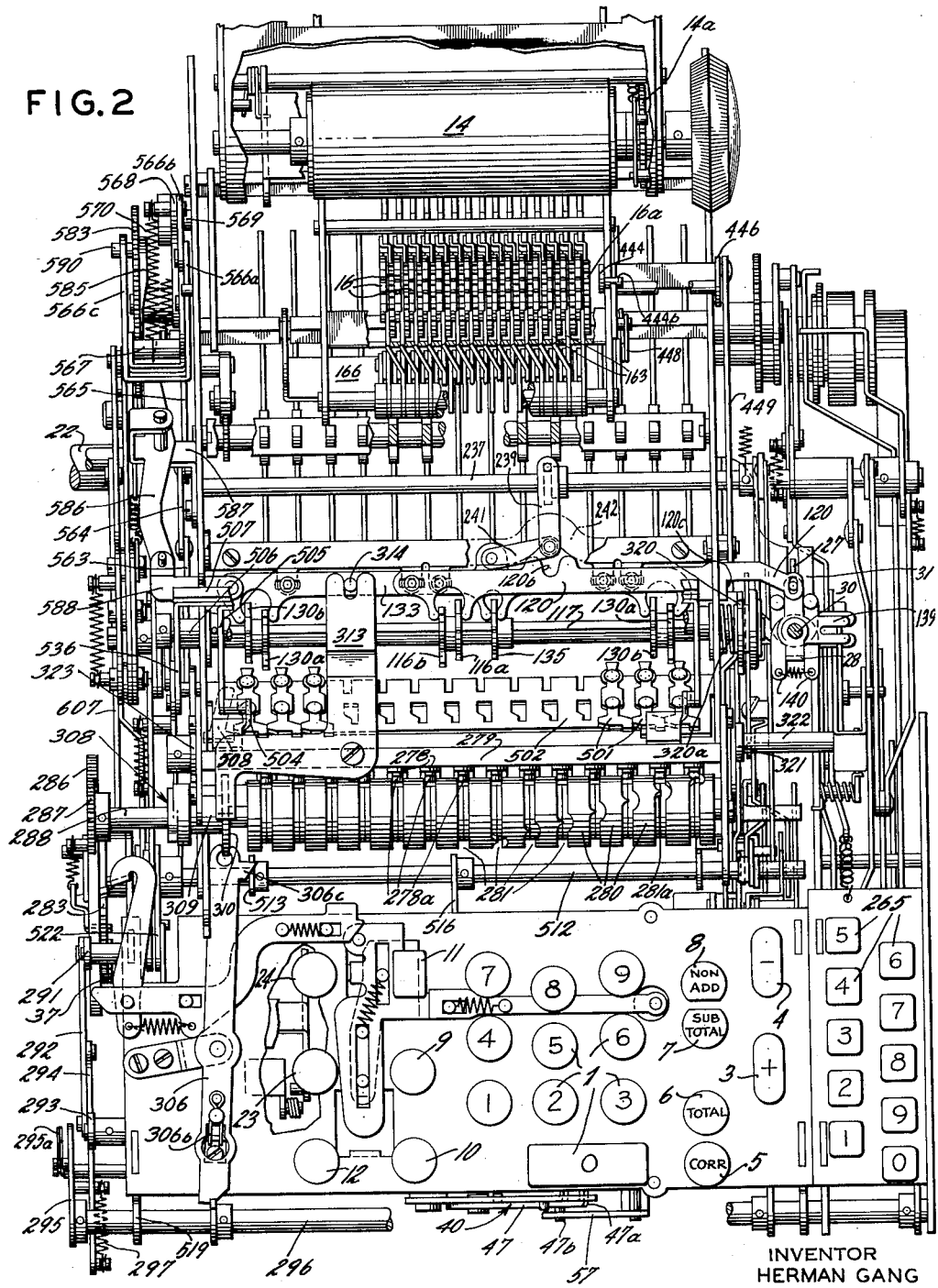
FIG. 2 is a plan view of the machine with the casing removed.

At the rear of the machine is the usual platen 14 and paper roll 15 (FIGS. 1, 2). Forwardly of platen 14 are type wheels 16 which are adjusted under control of the accumulator registering mechanism and operated in timed relation therewith.

MACHINE DRIVE

With reference to FIGS. 3, 4, 5, 8, the machine is driven by a motor 17 through a main clutch 18 located outwardly of the machine right side frame. The motor may be continuously operated or it may be engaged in well-known manner upon closure of a switch in response to engagement of the clutch upon depression of the machine operating keys.

Clutch 18 is of well-known construction in which the driving member comprising a toothed wheel 19 is adapted for engagement by a spring urged pawl 20 mounted on the driven member 21 of the clutch. The driven member 21 of the clutch is fast on a main drive shaft 22 on which a plurality of cams for performing various of the machine functions are mounted.

Figure 5:
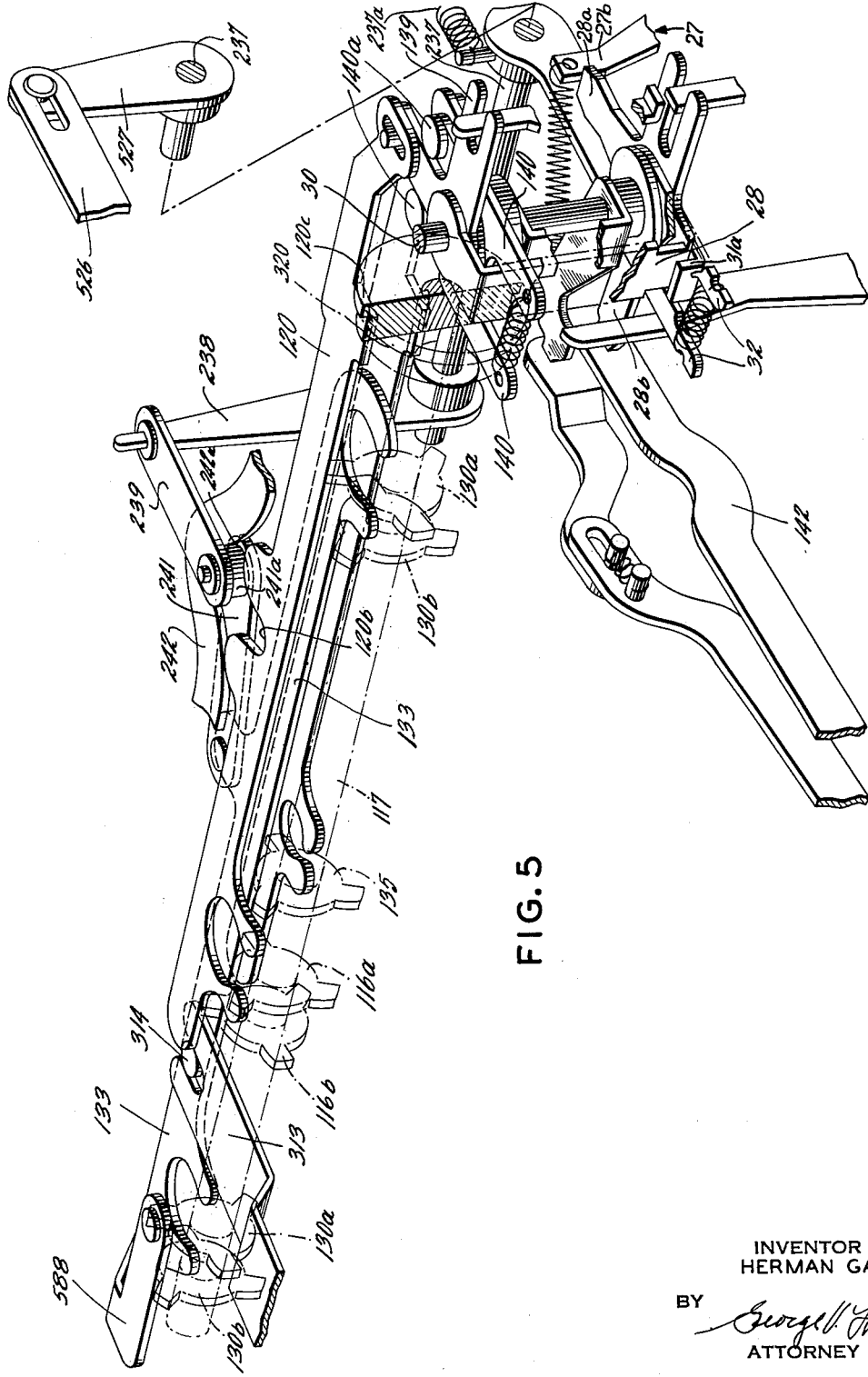
FIG. 5 is a perspective view of the main clutch engaging control means and sign control means for the single and double stroke registration.
Figure 8:
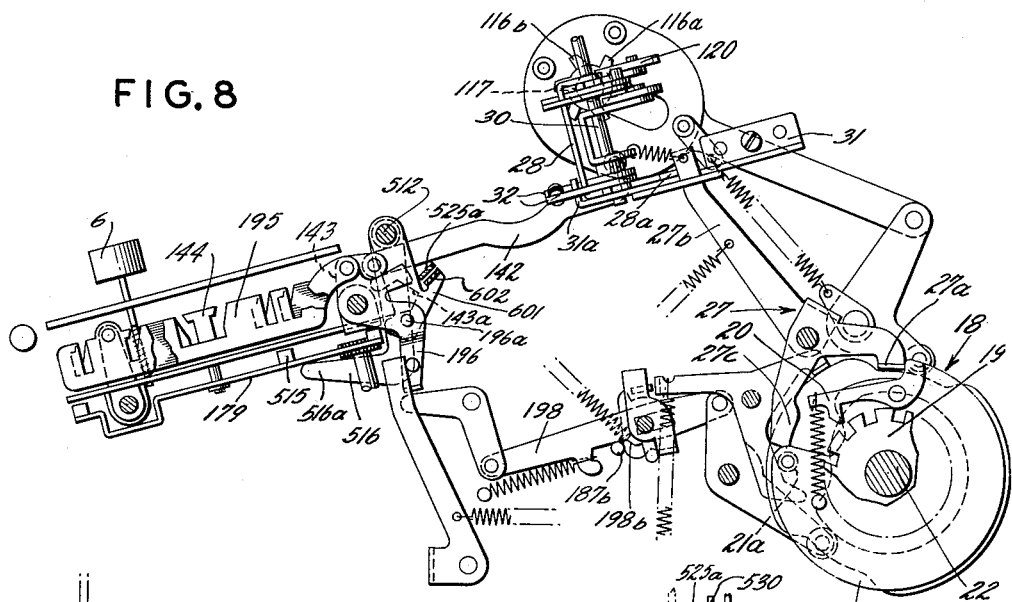
FIG. 8 is a side elevation of the main clutch, the add-subtract slide, and the total slide.

Normally pawl 20 is held, against the tension of its spring, in clutch disengaging position by a lug 27a at the end of one arm of a three-armed lever 27 as shown in the drawings. Lever 27 is spring urged counterclockwise and is normally restrained from such movement by engagement of the upper end of an upstanding arm 27b thereof with the end of a rearwardly extending lower arm 28a of a pivotally mounted U-shaped yoke 28 as best shown in FIGS. 5, 8.

Yoke 28 is pivotally mounted on a vertical shaft 30 which extends through lower arm 28a and through the opposed upper arm, and which is supported by an upper bracket 29 and a lower bracket 31 on the machine right side frame. A pair of scissor arms 32 have common pivotal mounting on shaft 30 adjacent the upper face of arm 28a of yoke 28 and normally are spring urged one toward the other to engage the opposite sides of an upstanding lug 31a of bracket 31.

Figure 4:
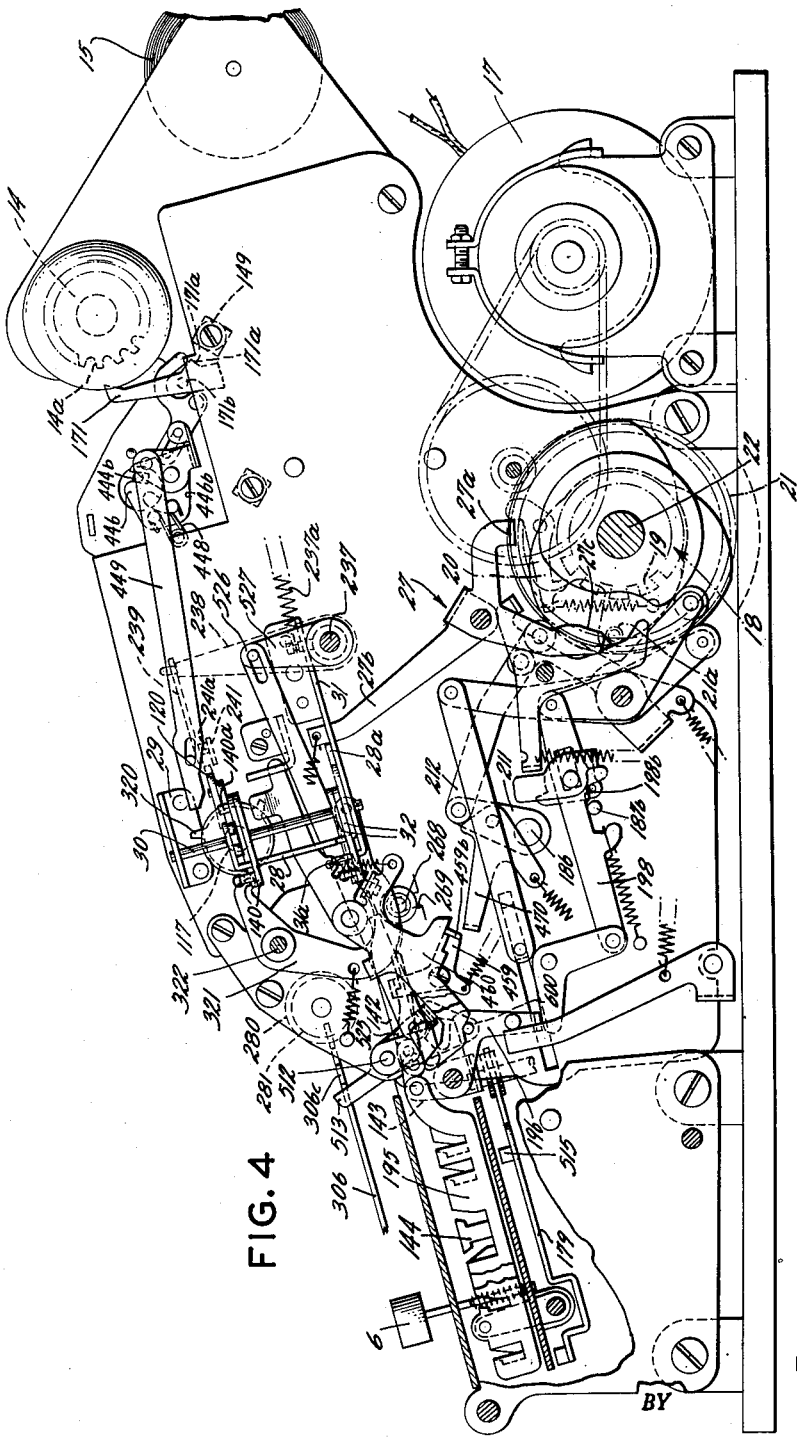
FIG. 4 is a right side elevation of the machine with parts removed showing the machine drive in conjunction with parts of the add, subtract and total taking mechanisms with the parts in normal position.

The vertical portion of yoke 28 connecting its two horizontal arms is of the same width as lug 31a and normally is engaged by the inner edges of the opposed arms of scissors 32 as they engage the sides of said lug. Yoke 28 is therefore yieldably held in a centralized position by scissor arms 32. In the normal centralized position of yoke 28, the end of its arm 28a will be engaged by the end of arm 27b to hold lever 27 in a clockwise clutch disengaging position as shown in FIGS. 4, 5.

Clutch 18 will be engaged upon pivotal movement of yoke 28 in either direction (FIGS. 2, 5) by control means hereinafter described. Upon pivotal movement of yoke 28, the end of its arm 28a will be removed from engagement with arm 27b of lever 27. Lever 27 will then be moved counterclockwise from the position shown in FIGS. 4, 8 to remove lug 27a from engagement with pawl 20. Pawl 20 will then be moved into engagement with driving member 19 of the clutch to complete the drive to driven member 21. Means for rocking yoke 28 to engage the clutch drive is hereinafter described in connection with the various machine functions.

During operation of clutch 18, the counterclockwise positioned arm of lever 27, by engagement with one side or the other of arm 28a will restrain yoke 28 in rocked position. However, if yoke 28 is released by the control means which initially effected the rocking operation thereof, clutch 18 will be disengaged at the end of the current cycle of operation as follows.

As the clutch approaches full cycle position, a pin 21a on the driven member 21 will engage an arm 27c of lever 27 thereby rocking said lever clockwise to normal position. Clockwise movement of lever 27 will move arm 27b thereof from engagement with the side of arm 28a of yoke 28 (FIGS. 4, 5) which will then be centralized by scissor arms 32. As clutch 18 completes its cycle of operation, lug 27a will be engaged by pawl 20 to disengage the clutch drive. Furthermore, upon movement of the clutch to full cycle position, pin 21a will be moved beyond arm 27c thus releasing lever 27. However, lever 27 will be restrained in normal clutch disengaging position by engagement of its arm 27b with the end of arm 28a of centralized yoke 28 (FIG. 5).

Should yoke 28, when released by arm 27b, be held in rocked position by the control means, later described, which effected the initial rocking operation, lever 27 will be immediately rerocked counterclockwise after release by pin 21a as the clutch moves to full cycle position. As a result, lug 27a will not engage pawl 20 and the clutch will not be disengaged but will remain continuously engaged until the end of a cycle of operation in which yoke 28 is released by the control means.

THE PIN CARRIAGE CONTROL

With reference to FIGS. 1, 3, 6, 7, pin carriage 2 is transversely shiftable beneath the keyboard of the machine. The carriage is supported at its front by a roller 33 which rides on a rail 34, and at its rear the carriage is supported by a bracket 36 which is slidably mounted on a worm shaft 37 of the carriage shifting mechanism. Worm shaft 37 is suitably journaled in the machine side frames, and fixed thereon inwardly of the left side frame is a pinion 38. Engaging pinion 38 is a segmental drive gear 39 which is pivotally mounted forwardly of worm shaft 37. A torsion spring 41 biases gear 39 counterclockwise (FIG. 7) thereby urging pinion 38 and worm shaft 37 clockwise. At the rear of carriage 2 is a pin 42 (FIGS. 1, 3) which engages the worm 37a of shaft 37. Worm 37a is directionally threaded so that clockwise movement of shaft 37 will shift pin carriage 2 toward the left.

Normally pin carriage 2 is held in its right end position (FIGS. 3, 6) against the urge of worm shaft 37 by an escapement 40 which is normally spring retracted in counterclockwise position. Upon each depression of a digital value key 1 to set a corresponding value in a pin 50 of a pin row of carriage 2, escapement 40 is rocked clockwise; and upon release of the depressed key, the escapement is restored and the carriage is escaped one ordinal position toward the left.

After entry of a digital value into pin carriage 2, it may be necessary to shift the carriage to the left end position to properly locate the set pins with respect to the actuator racks of the registering mechanism. This operation may be effected by repeated depression of zero numeral key 1. However to facilitate the operation, pin carriage 2 is adapted to be shifted to its left end position in response to a single depression of shift key 10. In this instance, means concurrently operable with the carriage shift is provided to set the zero value pin 50 of each pin row to the right of the previously set pins to prevent operation of the associated lower order registering mechanism.

Figure 6:
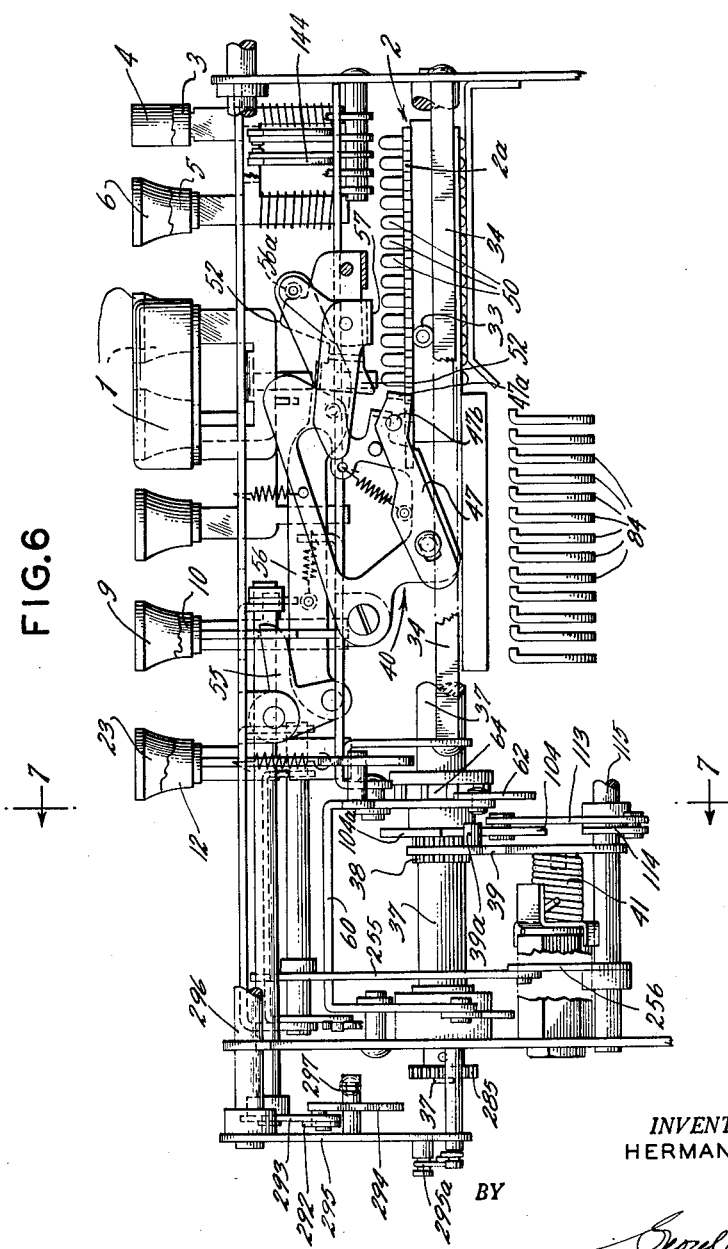
FIG. 6 is a front elevation of the pin carriage and associated mechanism.

Shift key 10 (FIGS. 2, 6) which is located to the left of the numeral key grouping, has a shoulder on its stem overlying an arm of a bell crank 55 which is located beneath the keyboard. A link 56 extends toward the right from crank 55 and has pivotal connection including a pin 56a with an upstanding arm of a crank 57. Extending toward the left is an arm of crank 57 which overlies a pin 47b on arm 47 of escapement 40. Link 56 is spring urged toward the right thereby normally positioning crank 55 counterclockwise and crank 57 clockwise as shown in FIG. 6.

Upon depression of shift key 10, crank 55 will be rocked clockwise thereby moving link 56 toward the left and rocking crank 57 counterclockwise. Upon counterclockwise movement of crank 57, the leftwardly extending arm thereof will engage pin 47b thereby rocking escapement arm 47 clockwise and releasing pin carriage 2 from restraint thereby. Furthermore, upon counterclockwise movement of crank 57, pin 56a will engage an arm of a crank 52 in the path of movement thereof and rock said crank counterclockwise. Upon release, pin carriage 2 will be shifted directly to its left end position by the urge of worm shaft 37, and during the shifting operation, the successive lower order zero pins 50 will be engaged by the left arm of crank 52 thereby setting said pins in depressed position. Upon release of the shift key, the parts will be restored with pallet 47a engaging a tooth space of rack 2a of the pin carriage.

After the actuator racks have completed their forward excursions (later described) under control of the pin carriage in each registering operation, means is operable to restore pin carriage 2 to its right end home position. Such means comprises an arm 104 (FIGS. 7, 6) which is moved toward the rear of the machine. Upon rearward movement of arm 104, a hooked end 104a thereof will engage a pin 39a on gear segment 39. This will rock segment 39 clockwise thereby rotating worm shaft 37 to restore the carriage. Means is provided to disable carriage return arm 104. Such means comprises a crank 114 fast on a shaft 115. A link 113 connects crank 114 and arm 104. To disable arm 104, shaft 115 is rocked clockwise to raise arm 104 through crank 114 and link 113. Hooked end 104a will therefore move ineffectively above pin 39a upon rearward movement of arm 104. This disabling means is controlled in connection with the program of division hereinafter described.

BACK SPACING

Figure 3:
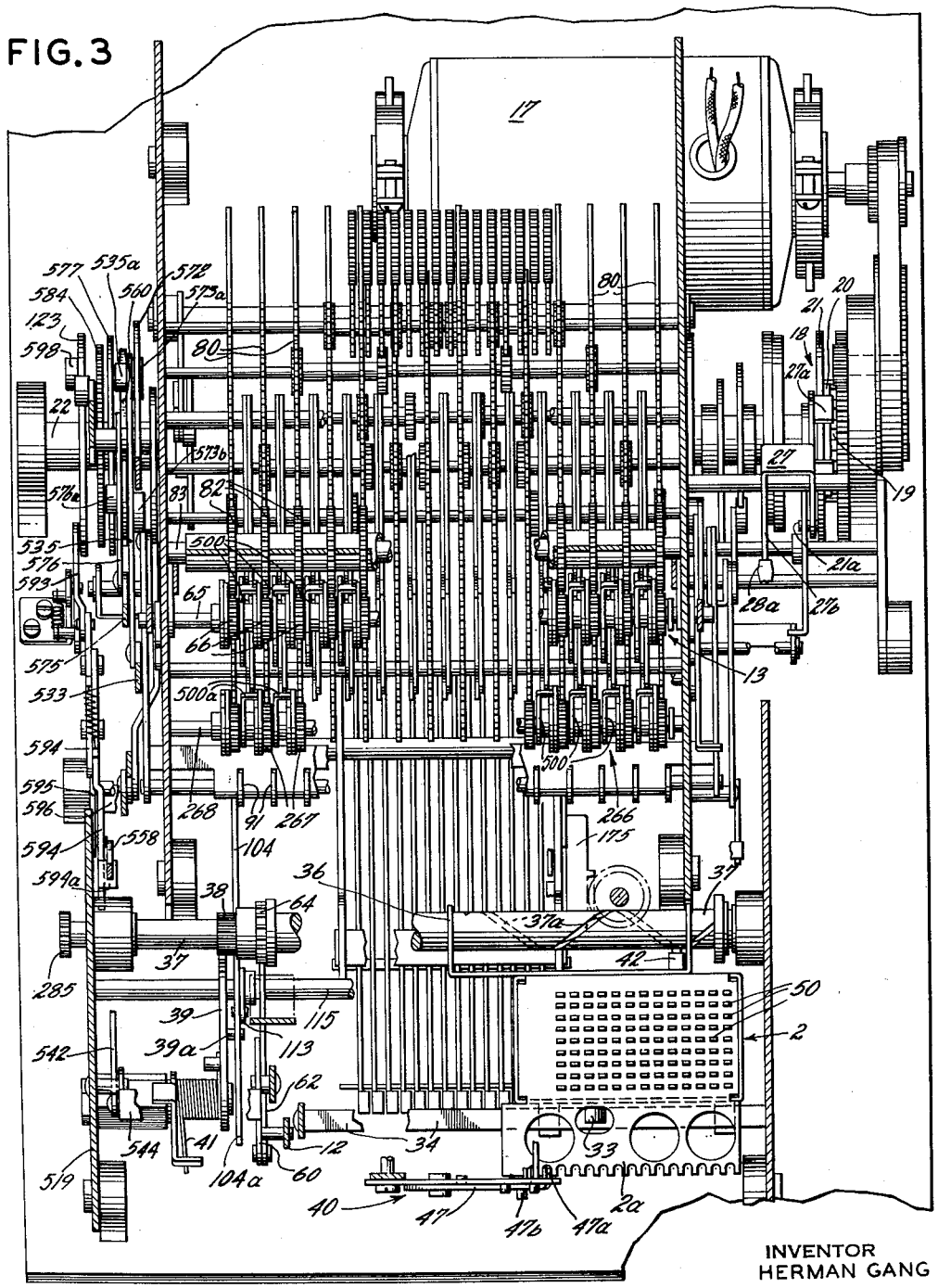
FIG. 3 is a plan view taken of the line 3—3 of FIG. 1.
Figure 7:
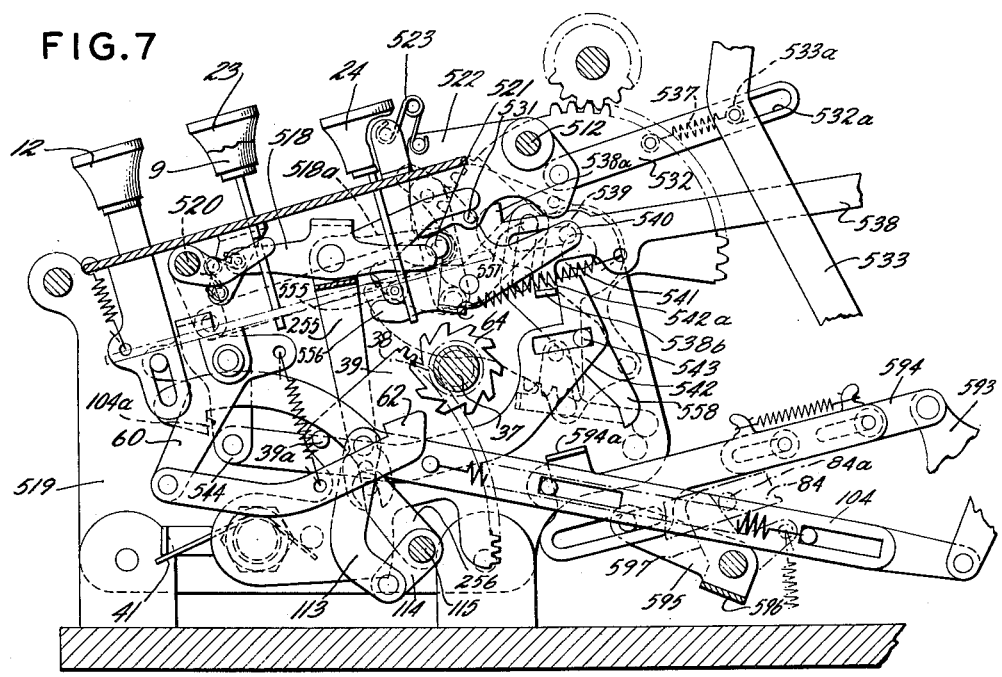
FIG. 7 is a fragmentary vertical section taken of the line 7—7 of FIG. 6 with the parts including the divide key in normal position.

Means is operable to back space pin carriage 2 in response to depression of key 12 (FIGS. 3, 6, 7). The stem of back space key 12 has slot and pin connection with a crank 60 which is mounted on the under side of a partition plate below the keyboard. The slot and pin connection permits crank 60 to be operated independently of key 12 for back space operations later described in connection with the program of division. Pivotally attached to a depending arm of crank 60 is a finger 62. Finger 62 is spring urged counterclockwise and is adapted to engage a ratchet wheel 64 which is fixed on worm shaft 37 to the right of pinion 38 (FIG. 6). Normally the free end of finger 62 is positioned forwardly of ratchet wheel 64. Upon depression of back space key 12, crank 60 will be rocked counterclockwise thereby moving finger 62 toward the rear of the machine. Upon movement of finger 62 toward the rear, its free end will engage a tooth of ratchet wheel 64 thereby rotating said wheel and worm shaft 37 counterclockwise to shift the pin carriage one ordinal position to the right.

THE ACCUMULATOR REGISTER

The crawl tens transfer accumulator 13 (FIGS. 1, 3, 10, 22) is of the type disclosed in Patent No. 1,829,180 as modified by Patent No. 2,450,787. The ordinal units of the accumulator, each including a digital input gear 66, are rotatably mounted on a shaft 65. Shaft 65 of the accumulator is supported by an adjustable linkage which is controlled to effect relative adjustment between the actuating mechanism (hereinafter described) and said accumulator to determine the sign of registration and the type of registration (single or double stroke).

THE ACTUATING MECHANISM FOR THE ACCUMULATOR REGISTER

The digital actuators for accumulator 13 include a rack 80 (FIGS. 1, 3) positioned below and in the vertical plane of each accumulator gear 66. To the rear of each gear 66 and meshed with the associated rack 80 is a reversing gear 82 rotatably mounted on a cross shaft 83. Normally gears 66, as shown in FIG. 1, are disengaged both from racks 80 and reversing gears 82.

Racks 80 are normally positioned to the rear (FIG. 1). During the first half of each registering machine cycle, racks 80 are moved forwardly in excursions determined by values set in pin carriage 2 and during the second half of the cycle the racks are restored. Each registering machine cycle has an initial dwell before racks 80 are moved forwardly, a mid-cycle dwell before said racks are moved toward the rear, and a terminal dwell after said racks are restored to the rear. This actuator rack drive and the controls therefor are old and well known in the art.

During the dwells of the actuator rack drive, selectively adjustable devices including cam wheels 116a, 116b, 130a, 130b, 135 (FIG. 5) and linkage operable thereby are operable to engage and to disengage accumulator gears 66 with racks 80 and with reversing gears 82 in certain predetermined sequences to determine the sign of registration and the type of registration (single or double stroke). Briefly the adjustable devices effect the following operations which are fully disclosed in the afore-noted application, Serial #618,230.

For additive single stroke operation, racks 80 are moved idly in their forward initial strokes and reversing gears 82 are idly rotated. During the mid-cycle dwell, accumulator 13 is lowered to engage accumulator wheel gears 66 with racks 80. Therefore, during the return strokes of the racks, wheel gears 66 will be rotated in additive counterclockwise direction to effect one complete digital registration in accordance with the values set in pin carriage 2. During the terminal dwell, accumulator 13 is raised to normal thereby disengaging wheel gears 66.

For additive double stroke operation, accumulator 13 is moved to the rear during the initial dwell of the drive to engage wheel gears 66 with reversing gears 82. Therefore, during the initial forward strokes of racks 80, reversing gears 82 will rotate gears 66 counterclockwise to effect one complete additive registration. During the mid-cycle dwell, gears 66 will be disengaged from reversing gears 82 and engaged with racks 80. Thus, a second complete additive registration will be effected during the return strokes of the racks after which the accumulator will be raised to normal disengaged position during the terminal dwell.

For subtractive single stroke operation, accumulator 13 is lowered during the initial dwell of the drive to engage wheel gears 66 with racks 80. Therefore, during the forward initial strokes of the racks, wheel gears 66 will be rotated in subtractive clockwise direction to effect one complete digital registration in accordance with the values set in pin carriage 2. During the mid-cycle dwell, accumulator 13 is raised to disengage wheel gears 66. Therefore, racks 80 will be restored idly and reversing gears 82 will be rotated idly.

For subtractive double stroke operation, accumulator 13 is lowered during the initial dwell of the drive to engage wheel gears 66 with racks 80. Therefore, during the forward initial strokes of the racks, wheel gears 66 will be rotated to effect one complete digital registration. During the mid-cycle dwell, gears 66 will be disengaged from racks 80 and engaged with reversing gears 82. Thus, a second complete subtractive registration will be effected during the return strokes of the racks after which the accumulator will be moved forwardly to normal disengaged position during the terminal dwell.

The adjustments of the devices to perform the above-described sign and registration control operations are effected by a pair of slides 120 and 133 (FIGS. 1, 2, 5). Slide 120 is adjusted from a normal centralized position to control single stroke registration, and simultaneous adjustment of slide 120 and 133 will control double stroke registration. Slide 120 is adjusted upon movement of yoke 28 which, as heretofore described, is rocked in either direction to engage clutch 18 (FIGS. 4, 8) of the machine drive.

To adjust slide 120, a bell crank 139 is mounted on shaft 30 adjacent the upper end of yoke 28. A pair of spring urged centralizing scissors 140 have a pair of studs 140a which yieldably locate crank 139 in centralized position with respect to yoke 28. The right end of slide 120 has pin and slot connection with crank 139. Upon counterclockwise movement of yoke 28 (FIGS. 2, 5) to engage clutch 18, crank 139 will move slide 120 to the left. This adjustment provides for additive single stroke registration. Conversely upon clockwise movement of yoke 28, slide 120 will be moved to the right to provide for subtractive single stroke registration.

An add-subtract slide 144 (FIGS. 4, 8, 20a) is operable to adjust yoke 28 to additive or subtractive position. Slide 144 is connected at its rear to the upstanding arm of a crank 143. The front end of a rearwardly extending link 142 also is connected to the upstanding arm of crank 143. The rear end of link 142 is connected to a leftwardly extending arm 28b of yoke 28 (FIG. 5).

A shoulder of the stem of add key 3 is adapted upon depression to engage a cam edge of slide 144 thereby moving the slide to link 142 forwardly to rock yoke 28 counterclockwise to add position. Conversely the stem of subtract key 4 will move slide 144 to the rear to rock the yoke clockwise to subtract position. As later described, slide 144 is adjusted to subtract position to initiate a division operation.

Means is operable to couple slides 120 and 133 for simultaneous adjustment. This will provide for additive or subtractive double stroke registration when the slides are simultaneously adjusted in accordance with the sign control adjustments described in connection with slide 120. The coupling means comprises a link 241 (FIGS. 2, 4, 5) attached at one end to the rear of slide 133. The opposite end of link 241 has connection through a roller 241a with the forward end of a rearwardly extending link 239. At its rear, link 239 has connection with the end of an upstanding arm 238, which at its lower end is fast on a rock shaft 237.

Normally, shaft 237 and arm 238 are urged to clockwise position by a light spring 237a (FIGS. 4, 5) thereby holding link 239 to the rear. This will locate roller 241a in a cam recess 242a in the forward edge of a fixed rail 242. With the parts in this position, slide 133 will be located by link 241 in an inactive central position. However, upon counterclockwise movement of shaft 237 and arm 238, roller 241a will be moved forwardly to engagement with a cam recess 120b at the rear edge of slide 120. This will couple slide 133 through link 241 for adjustment in accordance with the adjustment of slide 120. As later described, the registering mechanism is adjusted for subtractive double-stroke registration upon initiation of a program of division.

It will be appropriate at this time to note that slide 120 may be adjusted independently of the adjustment effected by yoke 28. This is made possible by the yieldable centralizing connection comprising scissors 140 between crank 139, to which slide 120 is attached, and yoke 28. This adjustment is effected in connection with the division program and supersedes the adjustment initially effected by yoke 28 as hereinafter described. The means which effects the superseding adjustment of the sign control devices will be termed the secondary setting means as distinguished from the primary setting means including yoke 28 which effects the initial setting operation.

OVERDRAFT DETECTION MEANS FOR THE ACCUMULATOR REGISTER

The division mechanism of the present invention provides means to effect operation of the overdraft detection devices in timed relation with the registering mechanism and to utilize the detection in the control of the division program. The operation of the devices in the detection of the overdraft per se forms no part of the present invention and reference is made to applicant's co-pending application, Serial No. 472,593, for a complete disclosure.

The overdraft detection devices include a stepped plate 500 (FIGS. 1, 2, 3, 10, 11) rotatively mounted on shaft 65 to the left of each wheel unit of accumulator 13 and coupled for rotation therewith. The steps respectively correspond to zones of digital registering positions to which the unit may be rotated during a registering operation.

Figure 11:
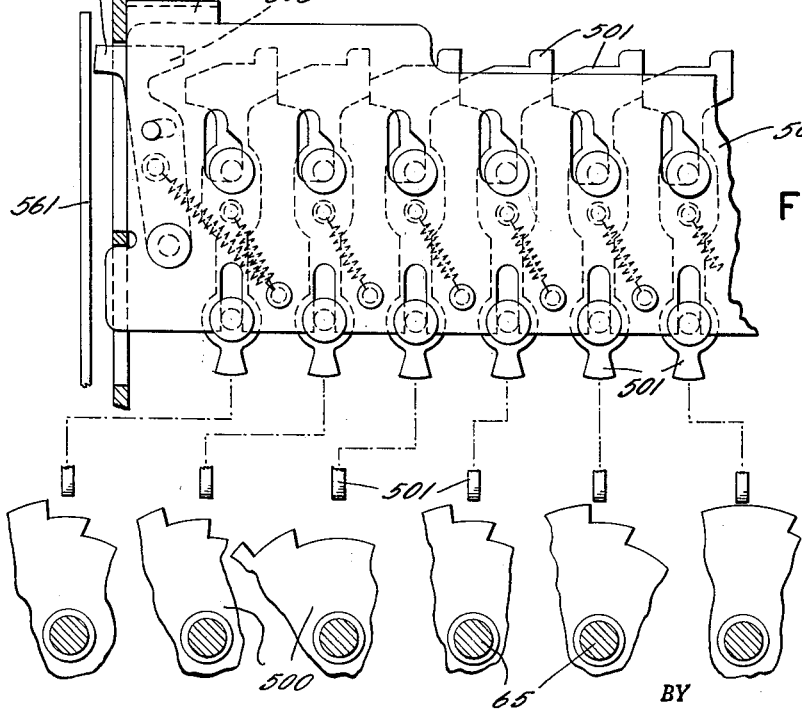
FIG. 11 is a side elevation of a series of the overdraft detection transmission devices in normal position and the associated control plates schematically illustrated.

Mounted above stepped plates 500 are a series of vertically disposed rocker arms 501 which are adapted respectively to sense the steps of plates 500. Rockers 501 are pivotally and slidably mounted at their lower ends on a plate 502. Normally, each rocker 501 is spring held in lowered clockwise position as shown in FIG. 11 with their lower ends immediately above the respective plates 500.

Plate 502 extends between the side frames of the machine and is slidably mounted for vertical movement at its opposite ends respectively in said side frames.

Normally, plate 502 is held in raised position by a spring 503. At the upper edge of each of its ends, plate 502 is provided with a bracket 504 to which the forward end of rearwardly extending arm 505 (FIGS. 1, 2) has pivotal attachment. Arms 505 at their rear are loosely mounted on cross shaft 506 which extends between the side frames and are connected by a bail 507 so that they may be rocked as a unit. As later described, bail 507 and arms 505 are rocked counterclockwise in timed relation with the registering mechanism to lower plate 502 to bring the lower ends of rocker arms 501 into sensing engagement with the steps of the respective plates 500.

When plate 502 is lowered to engage rocker arms 501 with the steps of plates 500, each rocker arm will either remain in lowered position with respect to plate 502, will be vertically raised, or will be both vertically raised and rocked. If the accumulator has been overdrafted at the time of the sensing operation, the highest order rocker 501 will be raised vertically with respect to plate 502 and rocked counterclockwise. Upon counterclockwise movement of the highest order rocker 501, its upper end will engage the upper end of overdraft indicating arm 508 which is pivotally mounted at its lower end to the left of said highest order rocker and which is spring biased clockwise.

The left upper end of arm 508 comprises a nose 508a (FIG. 11) which engages a slot in the left side frame. When the highest order rocker 501 is rocked counterclockwise and engages arm 508, the arm will likewise be rocked counterclockwise and thus move nose 508a outwardly through its slot in the side frame. As will be later described, outward movement of nose 508a is operable in conjunction with mechanisms of the division program.

THE COUNTER REGISTER

The counter register 266 (FIGS. 1, 3, 22, 26) is of the same crawl tens transfer type as accumulator 13 and comprises the same number of ordinal units. The ordinal units of the counter, each including a digital input wheel gear 267, are rotatably mounted on a shaft 268. The ends of shaft 268 are mounted in vertical slots 269 (FIGS. 20, 21, 25) in the machine framing, and are normally held in yieldable raised position by a pair of springs 270. With shaft 268 in normal raised position, wheel gears 267 are each engaged with an intermediate drive gear 271 and are each located above and disengaged from the ordinally corresponding actuator rack 80 of accumulator register 13. Intermediate drive gears 271 are rotatably mounted on a cross shaft 274 and each is positively located by a spring urged detent 275. In a total taking operation to print a quotient, as later described, counter register 266 is lowered to disengage wheel gears 267 from intermediate gears 271 and to engage them with actuator racks 80.

ACTUATING MECHANISM FOR THE COUNTER REGISTER

Actuating means for the counter register comprises a drive gear 276 (FIGS. 1, 13) associated with each intermediate drive gear 271. Gears 276 are splined for axial adjustment on a cross shaft 277. Adjusting means normally locates each gear 276 in disengaged position to the right from the position of FIG. 13 of the associated intermediate gear 271. The adjusting means for each gear 276 comprises a depending arm 278 which is pivotally mounted at its upper end to a transversely extending bracket 279 (FIGS. 1, 2). The lower end of arm 278 comprises a fork engaging the opposed sides of gear 276.

Forwardly of arms 278 is a cam drum 280. On cam drum 280 are a series of axially spaced concentric cam grooves 281. Each cam groove comprises an operating lobe 281a at one side wall and an opposed recess in the opposite side wall. Engaging each cam groove 281 is a pin 278a on one of the adjusting arms 278. Cam lobes 281a are spirally arranged so that upon clockwise rotation of drum 280 (FIGS. 1, 2, 13) said lobes will successively engage and then disengage pins 278a respectively from lower to higher orders.

When the parts are in normal position, drum 280 is located counterclockwise from the position of FIG. 13 to a position wherein the lowest order cam lobe 281a is one step of rotation from engagement with the associated pin 278a. Upon engagement of each pin 278a by the associated lobe 281a, its arm 278 will be rocked clockwise by the leftmost arm, as shown in FIG. 13, to engage the connected gear 276 with the related intermediate gear 271. Thus the orders of counter register 266 from lower to higher will be connected successively, upon rotation of cam drum 280, into driven engagement with respect to shaft 277.

Means is provided to rotate drum 280 (FIGS. 1, 2, 13) an initial step of movement to engage the lowest order cam lobe 281a with the associated pin 278a thereby adjusting the lowest order drive gear 276 to engaged position. Simultaneously with this step of movement, means is operable to couple drum 280 into driven relationship with worm shaft 37 (FIGS. 1, 3) of the shifting mechanism of pin carriage 2. The arrangement is such that upon each subsequent step of movement of the carriage toward the left, cam drum 280 will be rotated a step of movement to engage the next higher order cam lobe 281a with the associated pin 278a. The successive higher orders of the counter register will therefore be connected for operation by drive gears 276 respectively as said carriage is shifted toward the left.

The simultaneous stepping and coupling means comprises a segmental gear 283 (FIGS. 7, 12, 14, 15) mounted on a stub shaft 284 exteriorly of the left side frame. Engaging gear segment 283 is a pinion 285 fast on worm shaft 37 of the carriage shift drive. Mounted on stub shaft 284 adjacent gear segment 283 is a second gear segment 286. Gear segment 286 engages a pinion 287 fast on a shaft 288 on which cam drum 280 is also fast.

Figure 14:
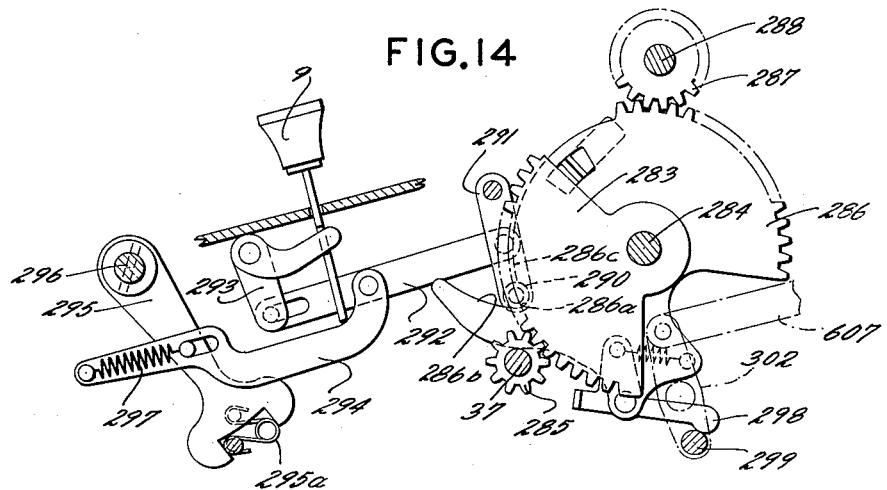
FIG. 14 is a fragmentary right side view, with the parts in normal position, of the means for coupling the counter register actuating mechanism for adjustment with the carriage shifting mechanism.

Means is provided to locate gear segment 286 in the normal uncoupled position with respect to gear segment 283 shown in FIGS. 12, 14. This means comprises a roller 290 at the lower end of a depending arm 291 which is pivotally mounted at its upper end. A forwardly extending link 292 is connected at its rear end intermediate the ends of arm 291, and at its front end is supported by pin and slot connection with the depending arm of a crank 293. Crank 293 includes a horizontal arm which is engaged by a shoulder of the stem of a decimal key 9 which is adapted to be depressed in proper decimal sequence upon depression of digit keys 1 to enter a divisor into pin carriage 2.

Intermediate the ends of link 292, the rear end of a forwardly extending link 294 is pivotally connected. Link 294 has pin and slot connection adjacent its forward end with a depending arm 295 which is fast on a shaft 296. Normally, arm 295 is held counterclockwise by a toggle spring 295a, and link 294 is held toward the rear with respect to arm 295 by a spring 297 to the limit of its slot and pin connection. With the parts in the normal position shown in FIG. 14, arm 291 will be in counterclockwise position and roller 290 will engage a cam recess 286a in the peripheral edge of gear segment 286. This locates segment 286 and entrained cam drum 280 (FIGS. 1, 2, 13) in home position.

The coupling means comprises a coupling pawl 298 pivotally mounted at the lower edge of segment 286. Pawl 298 is spring biased clockwise and a tooth at its left end is adapted to engage a tooth space of gear segment 283 upon clockwise movement, thereby coupling said segment 283 and segment 286. Normally a cam face on the underside of the right end of pawl 298 is engaged by a pin 299 thereby holding said pawl in counterclockwise disengaged position as shown in FIGS. 12, 14. Pin 299 is located at the lower end of a lever 302. This lever is rocked to move pin 299 clockwise (FIGS. 14, 15) during backspacing operation of pin carriage 2 in the division program later described.

Figure 15:
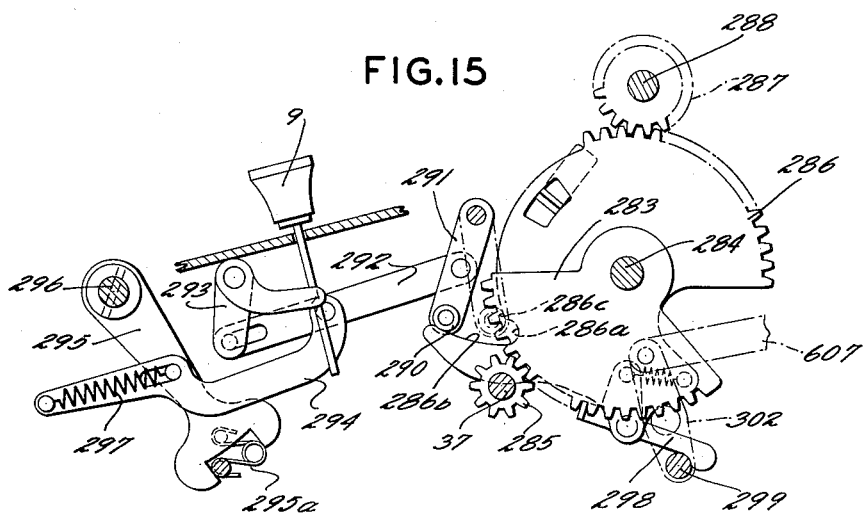
FIG. 15 is a view similar to FIG. 14 with the parts in an operated position.

Upon depression of decimal key 9, the shoulder of its stem will rock crank 293 clockwise as shown in FIG. 15 thereby moving links 292, 294 forwardly against the tension of spring 297 to rock arm 291 clockwise. In this operation, spring 297 is not strong enough to overcome toggle spring 295a, and the slot and pin connection will permit link 294 to move forwardly independently of arm 295.

In the program of multiplication disclosed in application Serial No. 618,231, arm 295 is rocked clockwise from the position of FIG. 14 thereby moving links 292, 294 forwardly to rock arm 291. In this operation, not concerned with this invention, the slot and pin connection of link 292 and crank 293 permits independent movement of the link with respect to the crank.

Upon clockwise movement of arm 291, roller 290 will be removed from engagement with locating cam recess 286a and will engage a forwardly extending cam surface 286b connected therewith. Engagement of cam surface 286b by roller 290 will rotate gear segment 286 one step of movement counterclockwise with respect to gear segment 283. This step of movement will remove the cam surface at the right end of pawl 298 from engagement with pin 299 thereby permitting clockwise movement of said pawl to engage the tooth at its left end with a tooth space of segment 286 thereby coupling segment 286 for subsequent rotation with said segment 283 as shown in FIG. 15. In this figure the parts are shown as positioned after entry of digits of a divisor in pin carriage 2 and subsequent depression of decimal key 9. Gear segment 283 therefore has been rotated to a counterclockwise position in dependence on the number of digits of the divisor before the coupling operation. Furthermore, during the initial step of movement of segment 286 and the attendant coupling operation, cam drum 280, entrained therewith, will be rotated a step of movement to engage the lowest order cam lobe 281a with the associated pin 278a, as shown in FIG. 13, thereby enabling the drive means for the lowest order of counter register 266.

Upon release of decimal key 9, the parts will be moved toward restored position by spring 297. However, roller 290 of arm 291 will engage the peripheral concentric edge 286c of gear segment 286 clockwise from recess 286a as shown in dot-dash lines (FIG. 15). Segments 283, 286 therefore will not be uncoupled until segment 286 is restored clockwise to engage recess 286a with roller 290 as later described.

After the above coupling operation and the release of decimal key 9, the entry of each additional digit in pin carriage 2 will be effective to rotate cam drum 280 (FIGS. 1, 2, 13) a step of movement to enable the drive means for the next higher order of counter register 266 while disabling the currently enabled order.

Normally, disabled means is operable to rotate shaft 277 (FIGS. 1, 13, 16, 17) on which drive gears 276 are splined, either additively or subtractively. The drive means for shaft 277 is operable in time with the drive means of actuator racks 80 of accumulator 13. The timing is such that during each cycle of operation of racks 80, two steps of movement may be imparted to shaft 277. Thus, two counts may be registered in counter register 266 for each cycle of operation of actuator racks 80. With this arrangement, in the program of division in which the double stroke registering operation of racks 80 is employed, the proper count for the registration of the quotient will be effected in counter register 266.

Figure 16:
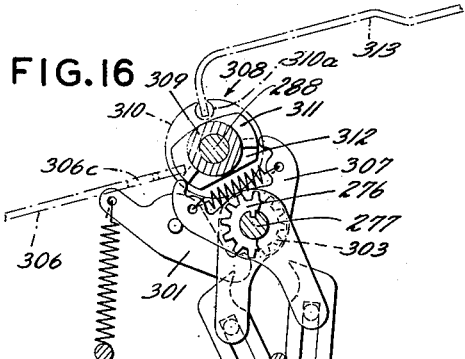
FIG. 16 is a right side elevation of the counter register actuating means with the parts in normal position.

The counter drive means (FIGS. 12, 16, 17) includes a pinion 303 fast on shaft 277 and yieldably held against rotation by a detent 301 exteriorly of the left side frame. One or the other of a pair of oppositely disposed counting fingers 304 is adapted to engage and rotate gear 303. Counting fingers 304 comprise a pair of normally disabled arms each having an active upper end or nose oppositely opposed and normally below gear 303 as shown in FIG. 16. Enablement of the rightmost finger will result in additive registration in the counter register and enablement of the leftmost finger will result in subtractive registration.

At their lower ends, fingers 304 have common pivotal mounting at the forward end of a lever 305. At its rear, lever 305 is provided with a cam slot 305a which engages a pin 95a on a spring-urged cam follower 95 of the drive means for actuator racks 80 (FIG. 1). Upon each cycle of operation of the actuator rack drive, follower 95 is rocked counterclockwise from the position of FIG. 16 and restored under control of a cam 96 fast on machine drive shaft 22.

Figure 17:
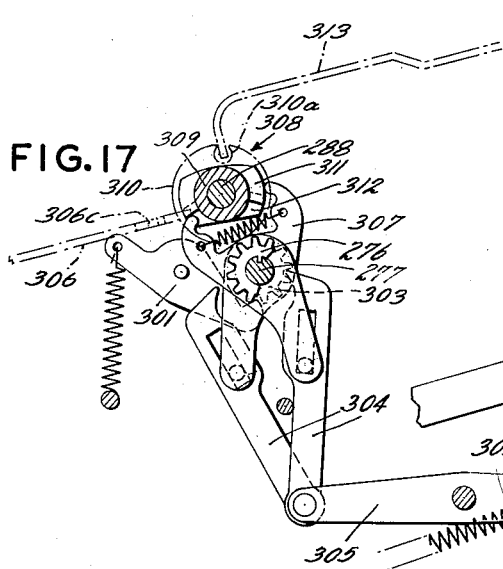
FIG. 17 is a view similar to FIG. 16 with the parts in an operated position.

Cam slot 305a is of obtuse inverted V-shape and normally pin 95a engages the rear end of said slot (FIG. 16). During the first part of the first half of a machine cycle, follower 95 will be rocked counterclockwise to engage pin 95a with the intersection of the legs of slot 305a as shown in FIG. 17. This will rock lever 305 clockwise to raise counting fingers 304 in their effective stroke of operation. During the last half of the first half of the machine cycle, follower 95 will be rocked further counterclockwise from the position of FIG. 17 to engage pin 95a with the forward end of cam slot 305a. This will restore lever 305 counterclockwise and lower counting fingers 304. During the second half of the machine cycle, follower 95 will be restored thereby duplicating the operation of raising and lowering fingers 304.

Counting fingers 304 are adjusted for operation under control of a pair of scissors 307. Scissors 307 are pivotally mounted on shaft 277 inwardly of gear 303, and at their lower ends have pin and slot connection with the respective counting fingers 304. Scissors 307 are operable to adjust fingers 304 under control of a sign determining device generally indicated by the reference numeral 308 (FIGS. 2, 16, 17, 18, 19).

Figure 18:
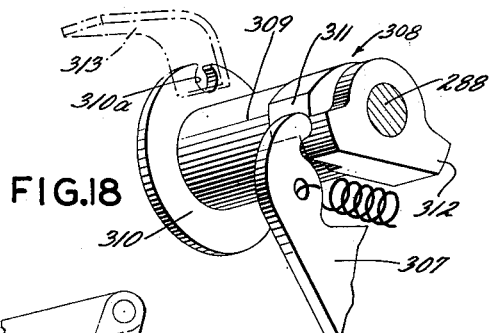
FIG. 18 is a fragmentary perspective of the sign control devices for the counter register actuating means as viewed from the left rear of the machine.

Device 308 comprises a sleeve 309 which is rotatable and axially slidable on shaft 288 on which cam drum 280 is fast. An adjusting disc 310 is integral with sleeve 309 at its right end (FIGS. 2, 19), at its left end (FIG. 18). At the opposite end of sleeve 309 and integral therewith is a pair of upper blocking wings 311 and a pair of lower blocking wings 312. Blocking wings 311, 312 are displaced from each other axially on sleeve 309 but overlap at a central connecting area whereat the upper and lower wings provide a continuous blocking surface. Scissors 307 are spring-urged inwardly at their upper ends and are therefore adapted to engage blocking wings 311 or 312, or are adapted to pass below or above said wings respectively in accordance with adjustment of sign control device 308.

Figure 19:
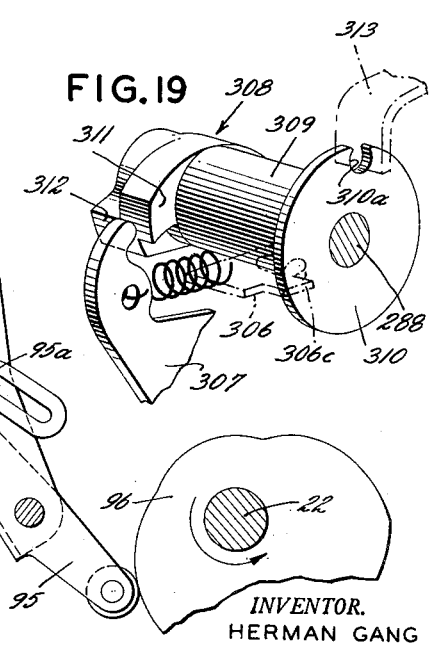
FIG. 19 is a view similar to FIG. 18 showing the parts as viewed from the right front of the machine.

When sign control device 308 is in normal axially centralized position, as shown in FIGS. 18, 19, the upper ends of scissors 307 will engage the overlapping blocking opposed faces of wings 311, 312. When the device is in this position, rotary adjustment thereof in either direction from a normal centralized angular position will be ineffective to remove either of the blocking surfaces of wings 311, 312 from the inward path of movement of the engaging upper ends of scissors 307. The lower ends of scissors 307 will therefore be held outwardly and likewise hold counting fingers 304 outwardly. Therefore, upon operation of said fingers, their operating ends will pass idly at opposite sides of gear 303. However, upon adjustment of device 308 axially in either direction and subsequent rocking adjustment, said device will be rendered effective to enable counting fingers 304 as follows:

Sign control device 308 is normally held in axially centralized position by a forwardly extending lever 306 (FIGS. 1, 2, 18, 19). The rear end of lever 306 comprises a fork engaging adjusting disc 310 of device 308. Lever 306 is held in centralized position by a centralizing spring 306b (FIG. 2) of well-known construction. A lug having a cam edge 306c extends to the right adjacent the rear end of lever 306. A division shaft 512 is rocked clockwise upon initiation of a division program, as later described. Upon clockwise movement (FIG. 1) of shaft 512, an upstanding arm 513 fast thereon will engage cam edge 306c and rock lever 306 counterclockwise to adjust device 308 axially toward the left (FIGS. 2, 19) toward the right (FIG. 18).

Sign control device 308 is normally held in angular centralized position by a bell crank 313 (FIGS. 1, 2, 5, 18, 19) comprising a rearwardly extending arm and a leftwardly extending arm. The leftwardly extending arm has a finger at its end which engages a notch 310a in the edge of disc 310 of control device 308. The rearwardly extending arm has a fork at its end which engages a pin 314 on double stroke registration control slide 133. When slide 133 is in centralized non-registration controlling position, crank 313 will adjust device 308 to its normal centralized angular position.

In the division program, later described, slide 133 is adjusted to the right to subtractive position for the well-known system of operation wherein the divisor is subtracted from the dividend until an overdraft occurs, and adjusted to the left to additive position for the usual operation to correct the overdraft. Movement of the slide to subtractive position will rock crank 313 clockwise and this will rock device 308 clockwise (FIGS. 16, 17, 19) counterclockwise (FIG. 18). Conversely, movement of the slide to additive position will reverse the above adjusting operations.

Upon axial adjustment of device 308 to the left (FIGS. 2, 19), to the right (FIG. 18) under control of the division mechanism, wings 311 will be brought into controlling position with respect to scissors 307. With centralizing device 308 in this axial adjusted position but in centralized angular position, the oppositely disposed wings 311 will both be in blocking position with respect to said scissors and counting fingers 304 will be disabled. However, when said device is angularly adjusted, as above described, upon movement of slide 133 to subtractive position, the left wing 311 (FIGS. 16, 17) will be raised above the inward path of movement of the associated upper end of scissor 307 as shown in FIG. 17. This scissor, therefore, will be rocked clockwise to move right counting finger 304 counterclockwise to active position. With this adjustment, however, right wing 311 will remain in the path of its associated scissor 307 and therefore the left counting finger will remain disabled. It will be noted that a limit pin controls the extent of inward movement of the enabled counting finger so that upon inward movement, it will engage gear 303 to effect one step of movement to effect an additive count in counter register 266 for quotient registration.

Upon movement of slide 133 to additive position to correct the overdraft of the dividend, the reverse of the above operations will be effected and the opposite wing 311 will be raised from blocking position and therefore the opposite counting finger 304 will be enabled. Thus, a subtractive count will be registered in counter 266 for the corrective operation.

PRINTING MECHANISM

Each ordinal unit of the printing mechanism comprises a type wheel 16 (FIGS. 1, 2) having peripherally spaced 0 to 9 type mounted on a spring-charged hammer plate 160 which is restrained by a latch 163. A suitable gear train connects each type wheel 16 with the ordinally corresponding actuator rack 80 and operates to adjust the wheel in accordance with the excursions of the rack. During the mid-cycle dwell of the actuator rack drive, at which time the actuator racks have completed their forward excursions, a bail 166 which has been rocked counterclockwise from the normal position shown in FIG. 1 by a spring-urged cam follower is restored to engage shoulders 164a of depending arms 164 which are pivotally attached at their respective upper ends to latches 163. Arms 164 are normally held clockwise with shoulders 164a out of the path of movement of bail 166 by the registering mechanism. However during registering operation, arms 164 are afforded counterclockwise movement in the orders in which registration is effected thereby bringing the respective shoulders 164a into the path of movement of bail 166. These arms therefore will be raised to release the associated hammers 160 to effect the printing operation.

A bail 174 is operable to restore hammers 160. Bail 174 is normally held in raised position by a pair of followers 172 which are attached to arms 174a at opposite sides of said bail and extend downwardly to engagement with like cams 173 on main drive shaft 22. When in raised position, bail 174 engages the undersides of arms 160a which extend rearwardly from hammers 160. During the forward strokes of actuator racks 80, bail 174 is lowered by followers 172 so that hammers 160 may be fired; and during the return strokes after the printing operation, bail 174 is raised by said followers thereby restoring the hammers to latched position.

With each restoring operation of followers 172, a drive finger 171 (FIG. 20) is operable to rotate platen 14 one step of movement clockwise thereby advancing the paper strip 15a from roll 15 (FIG. 1). Finger 171 is pivotally mounted on the right-hand follower 172 at its point of connection with arm 174a of restoring bail 174. Finger 171 extends upwardly and terminates in an operating end, adapted for engagement with a ratchet wheel 14a fast on the right end of platen 14. Finger 171 is a spring biased clockwise and is normally restrained from engagement with ratchet wheel 14a by a cam lug 171a at its rear which engages a fixed stud 149. As follower 172 is lowered cam lug 171a will be moved below stud 149 (FIG. 21) and finger 171 will be rocked clockwise to engage a tooth of ratchet 14a. As follower 172 and finger 171 are restored upwardly, the finger will advance ratchet wheel 14a and platen 14 one step and then be rocked to disengaged position by cam edge 171a upon re-engagement with stud 149.

The printing mechanism is normally disabled by a latch 177 (FIGS. 20, 21) which restrains bail 166 from initial counterclockwise rocking operation. Therefore, unless released, bail 166 will not be afforded the restoring movement which operates to raise arms 164 and trip latches 163. Means operable in connection with symbol printing mechanism is operable to control latch 177.

The symbol printing mechanism includes a symbol wheel 16a (FIG. 2) having appropriate type to indicate the character of the machine operation and located to the right of numeral type wheels 16. Symbol wheel 16a is mounted on a hammer plate 160 restrained by a latch 163 which is adapted to be released upon rocking operation of bail 166 as described in connection with hammers 160 of type wheels 16.

A symbol rack 175a of a slide 175 (FIGS. 20, 21) is adapted to adjust symbol wheel 16a for the printing operation. Normally, slide 175 is held toward the front of the machine against the bias of spring means which urges it toward the rear. During the initial stroke of the drive means for actuator racks 80, slide 175 is released for rearward movement to adjust symbol wheel 16a for the printing operation and after the operation the slide is restored.

Figure 9:
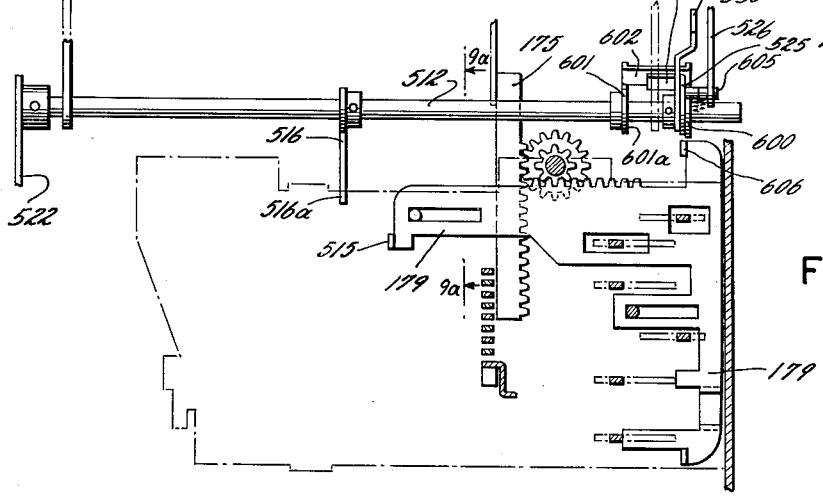
FIG. 9 is a fragmentary plan view of the symbol printing control mechanism.

A symbol plate 179 (FIGS. 8, 9, 21, 25) controls the extent of the rearward movement of slide 175 to thereby bring the appropriate type of wheel 16a to printing line position. Plate 179, which is slidably mounted for transverse movement below the keyboard, is entrained with slide 175 and is thereby normally held toward the right (FIG. 9). As slide 175 is moved toward the rear, plate 179 is moved toward the left until restrained from further movement by means adjusted into blocking position upon depression of the particular key which has initiated the machine operation. In this manner, plate 179 and entrained slide 175 are afforded predetermined degrees of movement to position the appropriate symbol type.

Figure 9A:
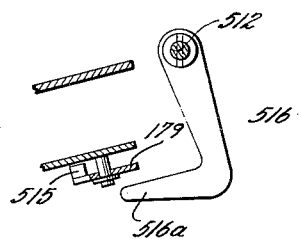
FIG. 9a is a fragmentary detail of parts of FIG. 9 taken along 9a—9a of FIG. 9.

In the program of division, means controlled by shaft 512 (FIGS. 8, 9, 9a) is operable to control the excursion of plate 179 and the adjustment of symbol wheel 16a. Plate 179 is provided with a lug 515 at its left rear edge. An arm 516 is fast on shaft 512 which is rocked clockwise, as before noted, in the initiation of a division program. Upon clockwise movement of shaft 512, a forward extension 516a of arm 516 will be moved into the path of movement of lug 515 thereby determining the excursion of plate 179 and the adjustment of symbol wheel 16a.

Latch 177 (FIGS. 20, 21) comprises a bifurcated member having forwardly extending upper and lower arms, and is pivotally mounted at its rear. Latch 177, which is spring biased clockwise, is normally held counterclockwise (FIG. 20) by a pin 175b on symbol rack 175a engaging a nose 177b at the forward end of the lower arm of said latch. A lug 177a at the end of the upper arm of the latch will therefore be held downwardly at the front of a shoulder at the upper side of the right arm of bail 166 to block said bail against operating movement. Thus, the printing mechanism is normally disabled. However, upon one or more steps of rearward movement of symbol rack 175a, pin 175b will be removed from engagement with nose 177b and latch 177 will be rocked clockwise thereby raising lug 177a a step of movement and out of the path of the shoulder of bail 166. Upon further rearward movement of symbol rack 175a to the position associated with a division operation (FIG. 21), pin 175b will be brought above a recess 177c in the upper edge of the lower arm of latch 177. This will permit latch 177 to be raised an additional step as later described in connection with printing control in a program of division.

TOTAL TAKING

In a total taking operation for accumulator 13 (FIGS. 1, 3, 10, 22), the crawl carry wheels are rotated to zero position successively from lower to higher orders by subtractive operation of actuator racks 80. The total taking controls include an add-subtract slide 144 (FIGS. 4, 8) adjustable in response to depression of total key 6 to engage the drive means for actuator racks 80 for single stroke subtractive operation, and control means conditioned by a total slide 195 simultaneously adjusted upon depression of said key and which modifies the subtractive operation of the actuator drive means as follows.

Add-subtract slide 144 has a link connection 142 (FIGS. 2, 4, 5, 8) with yoke 28. Upon depression of total key 6, slide 144 will be moved rearwardly thereby rocking yoke 28 clockwise to adjust sign control slide 120 to the right to subtractive position and to engage main clutch 18. Slide 120 is operable to adjust a three-lobe cam 116b (FIGS. 1, 2, 5, 8) which is splined for axial adjustment on a shaft 117. Upon movement of slide 120 to subtractive position, cam 116b will be moved from inactive position to active position with respect to an adjusting linkage which is spring biased to normally hold accumulator 13 disengaged from actuator racks 80 and reversing gears 82.

In a cycle of clutch 18, shaft 117 is stepped clockwise one 30° step of movement during the initial dwell of the actuator rack drive, two 30° steps of movement during the mid-cycle dwell of the drive and a final 30° step of movement during the terminal dwell of the drive. During the first step of movement of shaft 117 a lobe of cam 116b will be effective to operate the adjusting linkage to move and then to hold accumulator 13 in lowered position. This will engage wheel gears 66 (FIGS. 1, 22) of accumulator 13 with the respective actuator racks 80 for subtractive operation. In the total taking operation, however, the devices set upon adjustment of total slide 195 operate to interrupt operation of main clutch 18 before the actuator rack drive is effective to move racks 80 toward the front of the machine in their initial excursions. As an incident to the interruption of clutch 18, means is provided to release actuator racks 80 successively from lower to higher orders.

The means whereby successive release of actuator racks 80 is initiated includes a pin 187b of a latch 187 (FIGS. 8, 22) of the lowest order of the total taking mechanism. Upon interruption of clutch 18, a link 198 will be moved toward the front of the machine thereby engaging a cam edge 198b with pin 187b to release lowest order latch 187. Release of latch 187 will result in operation of mechanism to release column latch 91 (FIGS. 1, 22) of the lowest order actuator rack 80. Rack 80 then will be moved toward the front of the machine under the urgency of its spring and will rotate the lowest order of accumulator 13 subtractively toward zero.

As the lowest order wheel approaches zero position, a lug 500a of overdraft sensing plate 500 thereof will engage a cam edge 193a of a plate 193, and then as it moves into zero position, said lug will engage a total hook 191c of a plate 191. Upon engagement of lug 500a with total hook 191c, means will be operated to trip the next higher order latch 187. Thus, the operation will be extended across the machine until the highest order actuator rack 80 is moved to rotate the highest order of the accumulator to zero. Upon movement of the highest order accumulator wheel to zero, means is operable to reengage clutch 18 so that it will complete its cycle of operation. As clutch 18 continues its operation, the actuator rack drive will move column latches 91 toward the front of the machine forwardly of the front ends of racks 80.

During the mid-cycle dwell of the drive, the total will be printed and shaft 117 will be given its two steps of movement. The first of these two steps will move the effective lug of cam wheel 116b from holding position with respect to the adjusting linkage of accumulator 13. The accumulator will, therefore, be raised to normal and disengage wheel gears 66 from racks 80. During the return stroke of the actuator rack drive, latches 91 will reengage the ends of racks 80 thereby restoring said racks to the rear. During the terminal dwell of the actuator rack drive, the fourth step of movement of shaft 117 will bring the next lobe of cam 116b into the position which was occupied by the lobe which was active at the beginning of the cycle. The above briefly described total taking operation from accumulator 13 is the usual operation performed in response to depression of total key 6 unless the mechanism has otherwise been conditioned.

A total taking operation from counter register 266 (FIGS. 1, 3, 22, 26) is performed by subtractive operation of actuator racks 80 controlled by auxiliary control means in conjunction with the primary control means described in connection with the total taking operation from accumlator register 13. The controls are conditioned in response to performance of a division operation. Upon termination of a division operation, a total will automatically first be taken from counter register 266 to print the quotient and then a second total taking operation will automatically be initiated for accumulator register 13 to print the remainder. The means whereby the total taking operations are sequentially performed will be described later in detail. The immediately following description will set forth the means operable to control a total taking operation from counter register 266.

Splined for axial adjustment on shaft 117 exteriorly of the right side frame is a three-lobe cam wheel 320 (FIGS. 2, 5, 20, 21, 23, 24, 25, 27, 28) having the same operating characteristics as described in connection with cam wheel 116b which is adjusted by slide 120 in the total taking operation for accumulator 13.

Cam wheel 320 is adapted to operate a lever 321 located exteriorly of the right side frame and fast on a cross shaft 322. One arm of lever 321 extends toward the rear and terminates in a nose 321a. Normally, cam wheel 320 is held axially on shaft 117 by a spring 320a (FIGS. 2, 27) in a plane outwardly of nose 321a. Therefore, as shaft 117 is rotated, cam 320 will rotate idly with respect to lever 321 as shown in FIG. 21. The other arm of lever 321 extends downwardly and terminates in a cam edge 321b located forwardly of a collar 268a on the end of shaft 268 on which counter register 266 is mounted.

Shaft 322 which extends across the machine and exteriorly of the left side frame has fixed thereon a depending cam arm 323 (FIG. 12) similar to the arm of lever 321. Arm 323 terminates in a cam edge 323b adapted for engagement with a collar at the left end of shaft 268 of the counter register in the manner of cam edge 321b of the arm of lever 321. Normally, shaft 322, lever 321 and arm 323 are spring biased in clockwise position as shown in FIG. 20.

Slide 120 extends through a suitable slot in the machine right side frame and, as will be recalled, has connection with adjusting yoke 28 (FIGS. 2, 5) through a yieldable crank 139. When slide 120 is adjusted toward the right to subtractive position in response to depression of total key 6, a shoulder 120c thereof will be moved immediately adjacent the inner face of cam wheel 320. As hereinafter described, means is provided to move cam wheel 320 inwardly on shaft 117 into the plane of nose 321a of lever 321. At this time yoke 28 will be rocked to subtractive position. However, shoulder 120c by engagement with cam wheel 320, will prevent slide 120 from being adjusted to subtractive position by yoke 28 and crank 139 will yield. Cam wheel 116b therefore will remain in inactive position and a total will not be taken from accumulator 13.

During the first step of shaft 117 in the total taking operation, a lobe of cam wheel 320 will be effective to rock and then hold lever 321, shaft 322 and arm 323 counterclockwise as shown in FIGS. 25, 26. This will engage cam edges 321b and 323b with the collars at the ends of shaft 268 thereby moving counter register 266 downwardly to engage wheel gears 267 of each order of the register with the respective racks 80.

The total taking operation will progress as described in connection with accumulator 13 as actuator racks 80 operate to rotate the successive higher orders of the counter register to zero. Each order of the counter register includes a disc 325 (FIGS. 1, 22, 26), having a lug 325a which is the equivalent of lug 500a of each order of the accumulator register 13. As each wheel of the counter register approaches zero, lug 325a engages a cam edge 193c on plate 193 which is similar to cam surface 193a on said plate which is engaged by a lug 500a. Furthermore, upon movement of the wheel to zero, lug 325a will engage a total hook 191d on plate 191 which is the equivalent of total hook 191c on said plate which is engaged by lug 500a. Thus plates 191 and 193 are acted upon in the same manner by both lugs 500a and 325a in the total taking operations. During the mid-cycle dwell of the actuator rack drive, cam 320 will be stepped to release lever 321 and thereby permit counter register 266 to be raised to disengaged position.

From the foregoing it will be seen that cam 320 performs the same timing of engagement and disengagement of counter register 266 with racks 80 as cam 116b performs with respect to accumulator register 13. Furthermore, it will be seen that the lugs 325a of the respective orders of the counter register are operable in conjunction with cam surfaces 193c and total hooks 191d to operate parts 193 and 191 respectively in the same manner as lugs 500a of the accumulator wheels are operable in conjunction with cam edges 193a and total hooks 191c. It will be understood that otherwise the total taking operations for both counter and accumulator are effected in the same manner by the same mechanisms.

ENTRY OF THE DIVIDEND AND THE DIVISOR

The dividend is entered in pin carriage 2 (FIGS. 1, 2, 3, 6) upon successive depression of digital value keys 1 of the 10-key keyboard corresponding to the digits of said dividend from higher to lower orders. After entry of the dividend in pin carriage 2, shift key 10 will be depressed thereby causing a shift of the pin carriage to its leftmost position. After this, add key 3 will be depressed thereby causing the dividend to be registered in the highest order wheels of accumulator 13 and the pin carriage to be restored. During this operation, the printing mechanism will be operated and the dividend will be printed.

The divisor will then be entered in pin carriage 2 by depression of numeral keys 1 corresponding to said divisor from higher to lower orders. Furthermore, during the divisor entering operation, decimal key 9 will be depressed in proper decimal sequence. As previously described, depression of decimal key 9 will impart a step of movement to cam drum 280 thereby enabling the drive for the lowest order wheel of the counter register 266. After the drive for the lowest order of the counter register has been enabled each step shift of carriage 2 toward the left in response to entry of digits of the divisor following the decimal will cause the drive for the counter register to be shifted to the successive higher orders. If the divisor does not contain decimal digits, decimal key 9 will be depressed following entry of all the digits of the divisor.

After entry of the divisor including enablement of the drive for counter register 266, shift key 10 will be depressed thereby causing pin carriage 2 to be shifted to its leftmost position to align the highest order digit of the divisor in the pin carriage with the highest order digit of the dividend registered in accumulator register 13. It will be noted that depression of decimal key 9 in proper decimal sequence with respect to entry of the digits of the divisor will so enable the drive means for the counter register that the digits of the quotient will be registered in counter register 266 in correct decimal relationship with respect to the dividend in accumulator 13.

After entry of the dividend and the divisor, divide key 23 will be depressed to initiate the program of operations.

SETTING OPERATIONS AND INITIATION OF THE DIVISION PROGRAM

Upon depression of divide key 23 (FIGS. 2, 7, 29, 33) a number of setting operations which will control the program of operations will be effected and the program will be initiated. A shoulder of divide key 23 overlies a forwardly extending arm of a rocker 518 which is pivotally mounted on the inner face of a subframe 519 which is located forwardly of the left main side frame. Rocker 518 is normally held clockwise (FIG. 7) by a toggle spring 520 and has a rearwardly extending arm which is engaged by a shoulder of the stem of a stop key 24. Rocker 518 includes a second rearwardly extending arm 518a which at its end has a rightwardly extending pin 521. Pin 521 underlies the lower edge of a toggle plate 522 which is fast on the previously noted division shaft 512. Toggle plate 522 is normally held in counterclockwise position (FIG. 7) by a toggle spring 523.

Upon depression of divide key 23, rocker 518 will be rocked to the counterclockwise position of FIG. 29. Upon counterclockwise movement of rocker 518, pin 521 thereof will rock toggle plate 522 and division shaft 512 to the clockwise position of FIG. 29. Clockwise adjustment of division shaft 512 will initiate subtractive operation of the registering mechanism and effect a number of other setting operations as follows:

Adjacent the right end of division shaft 512 (FIGS. 4, 20, 20a) is fixed a downwardly extending arm 525 which has at its lower end a lug 525a. Lug 525a is normally located to the rear of a cam surface 143a of a rearwardly extending arm of crank 143 to which the rear end of add-subtract slide 144 is pivotally attached. Upon clockwise movement of shaft 512 and arm 525 fixed thereon, lug 525a will engage cam edge 143a of crank 143 thereby rocking said crank clockwise and moving add-subtract slide 144 rearwardly to subtract position. This will rock yoke 28 (FIG. 5) clockwise and engage the registering mechanism for subtractive operation as previously described.

Clockwise setting of division shaft 512 will set the registering mechanism for double stroke operation. This setting operation is effected by a rearwardly extending link 526 (FIGS. 5, 20a) which at its forward end is pivotally connected to arm 525. At its rear end link 526 has pin and slot connection with an upstanding arm 527 which is fast adjacent the right end of shaft 237. The pin and slot connection at the rear of link 526 permits adjustment of shaft 237 independently of link 526 in other registering operations not concerned with the present invention. Upon clockwise setting of division shaft 512, arm 525 will move link 526 forwardly thereby rocking arm 527 and shaft 237 counterclockwise against the tension of light spring 237a. As previously described, counterclockwise adjustment of shaft 237 will set the registering mechanism for double stroke operation.

Upon clockwise adjustment of division shaft 512, the drive means for counter register 266 will be set for registration of unlike sign with respect to the registration in accumulator register 13. This operation, as previously described, is effected by an arm 513 (FIGS. 1, 2) fast on shaft 512 which engages a cam edge 306c of lever 306. This adjusts lever 306 counterclockwise to adjust sign control device 308 toward the left to provide for unlike sign registration in the counter register.

Upon clockwise setting of division shaft 512, the forward extension 516a of arm 516 (FIGS. 7a, 8, 9, 9a) will be moved, as previously described, into the path of movement of lug 515 thereby determining the subsequent excursion of symbol plate 179 and the adjustment of symbol wheel 16a (FIG. 2).

Clockwise setting of division shaft 512 conditions control means which is operable to take a total automatically from counter register 266 and accumulator register 13 in response to termination of the ensuing program of division. The control means for the total taking operation comprises a rearwardly extending arm 530 (FIGS. 20, 21) which is pivotally mounted at its front on arm 525 and which is spring urged counterclockwise. At its upper edge, intermediate its ends, arm 530 is provided with a shoulder 530a. A crank 459 is normally spring held counterclockwise and has an upstanding arm having a lug 459a which normally is engaged by the upper edge of arm 530 and which overlies shoulder 530a (FIGS. 7a, 20, 21, 23, 24).

Upon clockwise setting of division shaft 512 and arm 525, arm 530 will be moved forwardly and will thereupon be rocked clockwise by its spring to engage shoulder 530a with the front edge of lug 459a as shown in FIG. 21. As will be later described, arm 530 will be restored to the rear as an incident to termination of quotient registration thereby rocking crank 459 clockwise. Clockwise movement of crank 459 will initiate the total taking operations later described.

Clockwise setting of toggle plate 522 (FIGS. 6, 7, 7a, 29, 33) upon the depression of divide key 23 disables the means normally operable to restore pin carriage 2 to its normal right end position during the last half of each machine cycle. This means comprises a crank 255 which has common pivotal mounting with rocker 518. A rearwardly extending arm of crank 255 overlies a pin 531 on toggle plate 522. A downwardly extending arm of crank 255 terminates in a forked end which engages a pin at the end of an arm 256, the other end of which is fast on shaft 115. As previously described, arm 114 having one end fast on shaft 115 is connected by a link 113 to carriage return arm 104. Upon clockwise movement of toggle plate 522, pin 531 will rock crank 255 counterclockwise thereby rocking arm 256 and shaft 115 clockwise. This will raise link 113 thereby raising the forward hooked end 104a of arm 104. Therefore as arm 104 is moved rearwardly during each cycle of registration, hooked end 104a will move idly above pin 39a of gear segment 39 which is normally rocked clockwise to effect the carriage return operation.

Clockwise setting of plate 522 enables the previously described overdraft sensing devices. A rearwardly extending link 532 (FIGS. 7, 7a, 21, 32, 33) is pivotally connected at its front to toggle plate 522. At its rear, link 532 has a slot 532a which is engaged by pin 533a intermediate the ends of a vertical link 533. Link 533 is pivotally mounted at its lower end to one arm of a cam follower comprising a lever 535. At its upper end link 533 has a slot 533b comprising a horizontal section and a vertical section extending upwardly from the left end of said horizontal section. The vertical section of slot 533a is normally engaged, as shown in FIG. 29, by a pin 536a at the front end of an arm 536 which at its rear is pivotally mounted on shaft 506 and which is connected with bail 507. Bail 507, as will be recalled, is connected with arms 505 (FIGS. 1, 2) which support the overdraft sensing devices for accumulator 13.

A spring 537 is attached to pin 533a of link 533 and extends forwardly to a point of attachment on link 532. Link 532 is therefore normally held toward the rear with the front end of slot 532a engaging pin 533a as shown in FIG. 7. Upon clockwise movement of toggle plate 522, as shown in FIG. 29, link 532 will be moved forwardly to tension spring 537. This will urge link 533 counterclockwise about its pivotal connection at its lower end on follower 535. However, at this time, link 533 will be restrained from such counterclockwise movement by engagement of the vertical section of its slot 533b with pin 536a. As later described, link 533 will be adjusted counterclockwise by spring 537 immediately following initiation of the first registering cycle of operation of the division program.

Operation of the overdraft sensing devices, as later described, is operable to condition mechanism for backspacing pin carriage 2 one ordinal position during the subsequent additive corrective registering operation.

The backspacing means comprises a rearwardly extending link 538 (FIGS. 7, 7a, 29) which is pivotally connected at its rear end with mechanism later described. At its forward end, link 538 is provided with a horizontal slot which is engaged by a pin 539 at the end of a rearwardly extending arm of a pivotally mounted plate 540. Plate 540 is spring biased counterclockwise by a spring 541 which extends between a lug at its lower edge and a connection at the lower edge of link 538. The front edge of plate 540 is provided with a locating recess 540a which is normally engaged (FIGS. 7, 7a) by pin 521 of rocker 518.

Figure 7A:
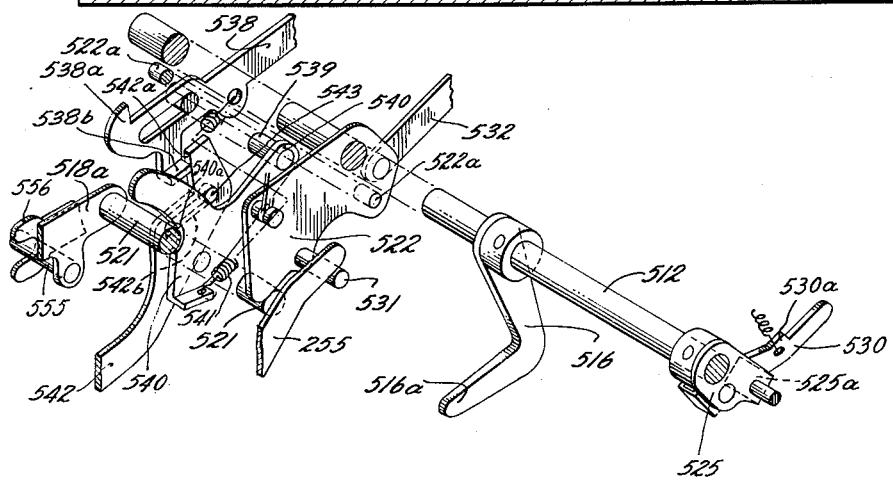
FIG. 7a is a fragmentary perspective of parts which are adjusted upon depression of the divide key.

When plate 540 is in normal counterclockwise position, pin 539 thereof engaging the slot at the front of link 538 will hold the front end of said link in raised position as shown in FIGS. 7, 7a.

Extending downwardly at the lower front edge of link 538 is a lug 538b which engages the front edge of a nose 542a at the rear end of a forwardly extending link 542. At its rear, link 542 is supported by a pin 543 which engages a slot 542b. At its front end link 542 has pivotal connection with a depending arm of a bail 544 which is connected with crank 60 of finger 62.

As will later be described, a backspacing operation for pin carriage 2 will be effected by rearward movement of link 538. Upon rearward movement of link 538, lug 538b thereof will move link 542 likewise toward the rear. This will rock bail 544 and crank 60 counterclockwise to move finger 62 toward the rear. Rearward movement of finger 62 will backspace pin carriage 2 one ordinal position as previously described.

When the front end of link 538 is in normal raised position and is moved toward the rear in a backspacing operation, a hook 538a at its front end will operate to restore toggle plate 522 and divide key 23. Hook 538a in its rearward movement will engage a pin 522a at the lower rear end of toggle plate 522. This will restore plate 522 counterclockwise and its lower edge engaging pin 521 will restore rocker 518 clockwise thereby restoring divide key 23. Restoration of plate 522 will result in termination of the division operation as later described.

In view of the above, the front end of link 538 is lowered upon depression of divide key 23 to prevent retraction of plate 522 until a later predetermined time. Hook 538a, therefore, will pass idly below pin 522a in a backspacing operation. Upon depression of divide key 23 and counterclockwise movement of rocker 518, pin 521 will be removed from recess 540a of plate 540 as shown in FIG. 29. This will rock plate 540 clockwise against the tension of spring 541 thereby lowering pin 539 at its rear. Pin 539 engaging the slot at the front end of link 538 will therefore lower said front end and move hook 538a below pin 522a of plate 522.

Upon depression of divide key 23, means automatically operable to restore said key is adjusted to enabled position. At the lower side of arm 518a of rocker 518 is a leftwardly extending pin 555. Pin 555 engages the front forked end of a rearwardly extending lever 556 which has common pivotal mounting with plate 540. At its rear end, lever 556 has a pin 557 which normally (FIGS. 7, 7a) engages the upper end of a slot at the upper end of an upstanding lever 558 which is fulcrumed on pin 543. The lower end of lever 558 is normally in raised counterclockwise position (FIGS. 7, 7a). Upon depression of divide key 23 and the attendant counterclockwise movement of rocker 518, pin 555 thereof will rock lever 556 to the clockwise position shown in FIG. 29. Clockwise movement of lever 556 will move pin 557 at its rear downwardly in the slot at the upper end of lever 558. This will rock lever 558 clockwise thereby moving its lower end to clockwise lowered position as shown in FIG. 29. When the lower end of lever 558 is in clockwise lowered position, it will be rendered operable in conjunction with mechanisms later described to restore divide key 23.

DIVISION

(REGISTRATION, OVERDRAFT SENSING AND CARRIAGE SHIFTING)

The divisor in pin carriage 2 will be subtracted from the dividend in accumulator 13 once during each half cycle of the registering mechanism until an overdraft of the dividend is detected. During each of these subtractions an additive count of one for the quotient will be registered in counter register 266.

As previously described, each cycle of the registering mechanism for accumulator 13 includes an initial dwell before actuator racks 80 (FIGS. 1, 3, 22) are moved forwardly, a mid-cycle dwell after the racks have completed their forward excursions under control of the settings of pin carriage 2, and a terminal dwell after the racks have been restored to the rear. The overdraft sensing devices are initially operated during the mid-cycle dwell of the first cycle of the registering mechanism and then again during the terminal dwell with the operation extending into the initial dwell of the following cycle. Thus it will be seen that the sensing devices are operated after each subtraction of the divisor from the dividend.

From the above, it will be seen that if an overdraft has occurred during the first half of a cycle, it will be detected during the mid-cycle dwell. In this instance, the last half of the cycle will comprise an additive corrective registration and this will effect a subtractive count in counter register 266 to correct the quotient digit registration.

Furthermore during the last half of the cycle, the backspacing mechanism for pin carriage 2 will be operated. As the pin carriage is back-spaced one ordinal position, the drive for counter register 266, which has been connected for shifting therewith, will be shifted to the next lower ordinal position.

If an overdraft has occurred during the last half of a cycle, it will be detected during the terminal dwell of that cycle and the initial dwell of the following cycle. In this instance, the first half of the following cycle will be idle and the correction and backspacing operations will be effected during the last half of said following cycle. After the additive corrective registration, the sensing devices will be operated. This operation however is superfluous as the accumulator must at this time be positive.

The operating means for the overdraft sensing device comprises the link 533 (FIGS. 7, 29, 32, 33) which is pivotally connected at its lower end to cam follower 535 as previously described. Link 533 and cam follower 535 are spring urged clockwise and a roller 535a at the rear of said follower engages a cam 560. Cam 560 is fast on main drive shaft 22 exteriorly of the machine's left side frame and is provided with a pair of lobes 560a and 560b.

When the machine is in normal full cycle position, roller 535a of follower 535 is engaged by lobe 560a. Normally, therefore, follower 535 is held counterclockwise (FIG. 29) with connected link 533 in lowered position. As previously described, when arm 533 is in normal lowered position, the vertical section of slot 533b at its upper end normally will be engaged by pin 536a of arm 536 as shown in FIG. 29.

During the initial dwell of the registration drive, lobe 560a of cam 560 will be removed from engagement with roller 535a thereby permitting follower 535 to be spring rocked clockwise from the position of FIG. 29 to the position of FIG. 33. Clockwise movement of follower 535 will raise link 533 thereby engaging the horizontal section of slot 533b with pin 536a. This will permit link 533 to be spring rocked counterclockwise to engage the horizontal section of its slot 533b with pin 536a.

During the mid-cycle dwell of the registration drive, cam lobe 560b will be moved into engagement with roller 535a (FIG. 32) and thereby restore follower 535 counterclockwise. Counterclockwise movement of follower 535 will lower link 533, and the horizontal section of its slot 533b engaging pin 536a will rock arm 536 counterclockwise as shown in FIG. 32. Counterclockwise movement of arm 536 will likewise rock bail 507 and arms 505 which are connected to plate 502 (FIGS. 1, 2, 11) on which the overdraft sensing arms 501 are mounted. Counterclockwise movement of arms 505 will lower plate 502 to engage the lower ends of sensing arms 501 with stepped plates 500 which are connected for rotation respectively with the wheels of accumulator 13.

The above comprises a sensing operation and if accumulator 13 has been overdrafted, rocker arms 501 will transmit counterclockwise rocking movement to signal receiving arm 508 (FIGS. 2, 11). Counterclockwise movement of arm 508 will move nose 508a (also FIGS. 29, 32, 33) at its upper end outwardly through the machine left side frame. As later described, the outward position of nose 508a through the left side frame will control certain operations of the division program control means.

As the registration drive means moves beyond the mid-cycle dwell, cam lobe 560b will be removed from engagement with roller 535a of follower 535 thereby permitting clockwise movement of said follower to raise link 533 and the connected sensing devices from sensing position. During the terminal dwell of the cycle, cam lobe 560a will again be brought into engagement with roller 535a of follower 535 to rock said follower counterclockwise and lower arm 533. However, now pin 536a will be engaged with the horizontal section of slot 533b and arm 536 will be rocked to move the sensing devices for a sensing operation.

The sensing operations will be effected during the successive mid-cycle and terminal dwells until an overdraft of accumulator 13 is detected and sensing arm 508 is rocked to project nose 508a outwardly through the side frame as previously described. When nose 508a is projected, devices are operable to terminate subtractive registration to institute an additive corrective registering operation and to back-space pin carriage 2 all as later described.

When overdraft sensing arms 501 (FIGS. 2, 11) are lowered during the mid-cycle and terminal dwells of the registration drive to sense plates 500 of accumulator 13, the previously described adjusting linkage will have released the accumulator from engagement with racks 80 and reversing gears 82 respectively and said accumulator will have been resiliently raised to disengaged position with respect to said racks 80 and to forward disengaged position with respect to said reversing gears 82 (FIG. 1). Means for resiliently adjusting accumulator 13 in disengaged position comprises a pair of springs 73 (one of which is shown in FIG. 31) connected respectively to the ends of shaft 65 on which accumulator 13 is mounted and which biases shaft 65 in a forward and upward direction. It is necessary therefore to provide means to rigidly lock the accumulator against yield during each sensing operation to prevent misoperation of the sensing devices.

Accumulator shaft 65 is mounted at each end in the lower end of a vertically disposed link 68, the left of which is shown in FIG. 31. The upper end of link 68 is pivotally connected to the front of an arm 69 which at its rear is fast on rock shaft 70.

Shaft 65 extends loosely through the front ends of a pair of horizontally disposed links 132 which are located respectively inwardly from links 68. Each link 132 is pivotally connected at its rear to the end of a depending arm of a bell crank 131 which is loosely mounted on rock shaft 70.

Shaft 70 is rocked counterclockwise (FIG. 31) to lower accumulator 13 into engagement with actuator racks 80 (FIG. 1). Upon counterclockwise rotation of shaft 70 arms 69 fast thereon will lower links 68 and accumulator shaft 65 against the tension of springs 73 to engage accumulator 13 with racks 80.

Bell cranks 131, loose on shaft 70, are rocked counterclockwise to engage accumulator 13 with reversing gears 82 (FIG. 1). Upon counterclockwise movement of bell cranks 131 (FIG. 31) links 132 and shaft 65 will be moved toward the rear, against the tension of springs 73, to engage accumulator 13 with reversing gears 82.

The accumulator locking devices comprise a vertically disposed link 575 (FIGS. 29, 31, 32, 33) pivotally connected at its lower end to the front of an arm 576 which has common pivotal mounting at its rear with cam follower 535 and lever 572. A roller 576a intermediate the ends of arm 576 is adapted for engagement by lobe 577a or 577b of a cam 577 fixed on drive shaft 22 adjacent cam 560.

Cam lobe 577a is moved into engagement with roller 576a immediately before the engagement of cam lobe 560a with roller 535a to effect operation of the sensing devices (FIG. 29); whereas lobe 577b engages roller 576a immediately before engagement of roller 535a by cam lobe 560b (FIG. 32). When roller 576a is engaged by lobe 577a or 577b, link 575 will be raised (FIGS. 29, 31, 32) to move a pin 575a at its upper end from the bottom to the top of a slot 578a at the front of an arm 578 which is fixed at its rear on the left end of shaft 506 on which bail 507 of the sensing devices is rockably mounted. Furthermore, when link 575 is raised, a shoulder 575b thereof will be raised to engage the underside of a pin 580 which pivotally connects the left-hand link 68 to arm 69.

With pin 575a engaging the top of slot 578a, arm 578, shaft 506 to which it is fast and an arm 582 fast on said shaft will be restrained from counterclockwise movement.

A forwardly extending arm of each bell crank 131 has link connection 581 with the front end of arm 582. Bell cranks 131, therefore, will be restrained from counterclockwise movement, and shaft 65 and accumulator 13 will be restrained from rearward movement by links 132. Furthermore, with shoulder 575b engaging pin 580, left-hand arm 69 and shaft 70 on which it is fast will be restrained from counterclockwise movement. Right-hand arm 69 fixed on shaft 70 therefore also will be restrained from clockwise movement. Arms 69, restrained from counterclockwise movement, will restrain links 68 and accumulator shaft 65, mounted at the end of said links, from downward movement. Thus accumulator 13 will be locked against movement during the overdraft sensing operations.

From an inspection of FIGS. 29 and 33, it will be seen that when a cam lobe 560a or 560b is moved to terminate a sensing operation, cam lobe 577a or 577b respectively will be moved to release locking link 575. Thus accumulator 13 will be released so that it may be adjusted into driven relation with racks 80 or reversing gears 82.

The mechanism operable in conjunction with nose 508a of signal receiving arm 508 (FIGS. 2, 11) comprises a vertically disposed lever 561 (FIGS. 29, 32, 33) which is fulcrumed on a stud 562 projecting outwardly from the left side frame. A link 563 is pivotally connected at one end to the lower end of lever 561 and extends upwardly to the rear. A link 564 is pivotally connected at one end to the upper end of link 563 and extends downwardly towards the rear. A link 565 is pivotally connected at one end to the lower end of link 564 and extends toward the rear where it has pivotal connection with a toggle link 566a which is pivotally mounted on a fixed stud 567. A second toggle link 566b extends between the end of link 566a and the upper end of a vertically disposed lever 568 which is fulcrumed on fixed stud 569. A spring 570 extends between the upper end of lever 568 and stud 567 thereby normally holding lever 568 counterclockwise and toggle links 566a, 566b in the collapsed position of FIG. 29.

A lever 572 has common pivotal mounting with cam follower 535 and arm 576, and has an upwardly extending arm, the end of which has pivotal connection intermediate the ends of link 564. The opposite end of lever 572 extends downwardly toward the rear and is normally spring urged clockwise into engagement with a roller 573a mounted on the face of cam 560.

As the registration drive moves beyond the initial dwell, roller 573a will be moved from engagement with lever 572 thereby permitting said lever to be rocked clockwise by its spring to the position of FIG. 33. This will rock link 564 clockwise about its connection with link 565. Clockwise movement of link 564 will move link 563 toward the rear and rock lever 561 counterclockwise into engagement with shaft 322 which acts as a limit stop.

During the mid-cycle dwell of the registration drive, a roller 573b, oppositely disposed to roller 573a on cam 560, will engage lever 572 thereby restoring said lever counterclockwise as shown in FIG. 32. When there has been no overdraft of accumulator 13, this will restore lever 561 clockwise to the position of FIG. 29 for the reason that the plane of movement of the upper end of lever 561 is normally outwardly from nose 508a of arm 508. If, however, the accumulator 13 has been overdrafted, operation of the overdraft sensing devices will have projected nose 508a outwardly into the plane of movement of lever 561 and the operation will be as follows.

First, the operation will be considered when accumulator 13 has been overdrafted during the first half of a cycle of registering mechanism. At the time the overdraft occurs, lever 561 will have been rocked counterclockwise from the position of FIG. 29. Just before roller 573b engages lever 572 to restore lever 561 clockwise, cam lobe 560b will engage roller 535a thereby operating the overdraft sensing devices and causing projection of nose 508a of arm 508 toward the left (FIGS. 2, 11) and into the plane of movement of lever 561. Shortly thereafter roller 573b will engage and restore lever 572 counterclockwise as shown in FIG. 32. Counterclockwise movement of lever 572 will tend to restore lever 561 clockwise as previously described. Now, however, nose 508a will block clockwise movement of lever 561, and as a result, link 564 will be rocked counterclockwise at its lower end from the position of FIG. 29 to the position of FIG. 32. Clockwise movement of link 564 will move link 565 connected thereto toward the front of the machine thereby rocking toggle link 566a clockwise to set the toggle comprising said link 566a and link 566b. When toggle 566a—566b is moved to set straightened position (FIG. 32), lever 568 connected to toggle link 566b will be rocked clockwise.

On the lower end of lever 568, a gear 583 is rotatably mounted. Gear 583 engages a gear 584 which is fast on main drive shaft 22 exteriorly of cam 577. Mounted on the inner face of gear 583 and concentric therewith is a cylindrical cam 585 which has an inner cam edge comprising a high dwell 585a and a low cam dwell 585b.

Cam 585 is operable to control a lever 586 which is mounted on a bracket 587 on the outer face of the left side frame (FIGS. 2, 12, 30). Lever 586 extends downwardly toward the rear and terminates in a nose 586a which is adapted for engagement by the cam edge of cam 585. However, when toggle 566a—566b is in normal collapsed position, the counterclockwise position of lever 568 will locate the edge of cam 585 to the rear (FIGS. 29, 30) of nose 586a of lever 586.

The forward end of lever 586 has pivotal connection with a link 588 (FIGS. 2, 5, 30) which extends inwardly through a suitable opening in the left side frame and has pivotal connection with sign control slide 133. When sign control slide 120 and coupled slide 133 are toward the right to control the registering mechanism for double stroke subtractive operation in the division program, lever 586 will be rocked to the counterclockwise dot-dash position of FIG. 30.

When lever 568 is rocked to the clockwise position of FIG. 32, immediately subsequent to detection of the overdraft of accumulator 13, the cam edge of cam 585 will be moved into engagement with nose 586a of lever 586. At this time, cam 585 will have been rotated so that the high portion 585a will engage nose 586a. Lever 586, therefore, will be rocked from the counterclockwise dot-dash position of FIG. 30 to the clockwise dotted position. Clockwise movement of lever 586 to the dotted position will move sign control slide 133 and sign control slide 120 coupled thereto toward the left (FIGS. 2, 5) to additive control position. This operation will be effected during the mid-cycle dwell of the registration drive and the high portion 585a of the cam edge will be engaged with nose 586a until the terminal dwell of the cycle. Therefore, the last half of the cycle will comprise an additive corrective registering operation. During the above described adjustment of sign control slides 120, 133 from subtractive to additive position, clutch control yoke 28 (FIGS. 2, 5) will remain in clockwise subtractive position. This is made possible by the yieldable connection comprising bell crank 139 and centralizing scissor arms 140.

During the terminal dwell of the cycle, means is provided to break toggle 566a—566b thereby restoring the parts settable therewith. Toggle link 566a has integral therewith a rearwardly extending arm 566c. The end of arm 566c is normally above the rotary path of movement of a pin 590 which projects outwardly from the face of gear 583 (FIG. 29). However, when toggle link 566a is rotated clockwise to set position, the rear end of arm 566c will be lowered into the path of movement of pin 590 (FIGS. 32, 33).

During the terminal dwell of the cycle, pin 590 will engage the end of arm 566c to rock toggle link 566a counterclockwise thereby permitting toggle 566a—566b to collapse and thus restore the parts including movement of sign control slides 120, 133 back to subtractive position. The following registering operation therefore will be subtractive. Furthermore, during the terminal dwell, lobe 560a of cam 560 will rock follower 535 to again operate the overdraft sensing devices, and roller 573a will rock lever 572 which operates linkage 561, 563, 564 etc. However, the overdraft will have been corrected and operation of the overdraft sensing devices will not project nose 508a, and therefore arm 561 will be rocked idly.

In addition to the above described operation to break toggle 566a—566b, pin 90 is effective to operate the backspacing means for pin carriage 2. The previously described link 538 of the backspacing means is pivotally connected at its rear to a depending arm of a crank 591 which is normally spring urged clockwise against a suitable limit stop. The lower end of the depending arm of crank 591 is normally outwardly from the rotary path of movement of pin 590 (FIG. 29). However, when toggle 566a—566b is set and lever 568 is rocked clockwise (FIGS. 32, 33) the rotary path of movement of pin 590 will be moved upwardly above the end of the depending arm of crank 591. During the additive corrective cycle which occurs during the return stroke of the registering mechanism, pin 590 will engage the depending arm of crank 591 (FIG. 33) thereby rocking said crank counterclockwise to move link 538 toward the rear to effect a backspacing operation for pin carriage 2 as previously described. The divisor in pin carriage 2 will therefore be shifted into position for subtraction from the next lower orders of the dividend and the subtractive operation will follow without interruption after the additive correction.

If the overdraft should occur during the last half of the cycle, toggle 566a—566b will be set during the terminal dwell. At this time, the low cam edge 585b will be in position to engage nose 586a of lever 586 as shown in FIGS. 29, 30. Engagement of the low cam edge 585b will move lever 586 from the dot-dash position of FIG. 30 clockwise to the full line position. This will move sign control slides 120, 133 to the left (FIGS. 2, 5) from subtractive position to neutral position.

The low cam edge 585b will remain engaged with nose 586a until the mid-cycle dwell of the following cycle of the registering mechanism. The first half of this cycle will therefore be idle. However, during the mid-cycle dwell, the high portion 585a of the cam edge will be rotated into engagement with nose 586a thereby rocking lever 586 further clockwise to the additive control position. Therefore, during the last half of the cycle an additive registering operation will be effected, pin carriage 2 will be backspaced, toggle 566a—566b will be collapsed, the program will be continued all as previously described.

DIVISION (STOPPING OPERATIONS)

The program of registration and carriage shift will be terminated in response to retraction of divide key 23 (FIGS. 2, 7, 29, 33). After retraction of the divide key, the operation will continue until completion of the registration of the current quotient digit. The quotient digit registration will be completed with the additive correction of the dividend and the accompanying subtractive correction of the current quotient digit. This will be accompanied by the previously described backspacing operation of pin carriage 2.

Divide key 23 may be retracted by manual depression of stop key 24 by the operator when he has observed that quotient registration is completed or that the desired number of quotient decimal digits have been registered. If stop key 24 is not manually depressed, automatic means is operable to retract divide key 23 in response to operation of the lowest order actuator rack 80. This operation will be effected in the registering operation following shift of the lowest order significant divisor digit in pin carriage 2 into controlling position with respect to said lowest order rack 80.

The stem of stop key 24 has a shoulder which overlies a rearwardly extending arm of rocker 518. Therefore when divide key 23 is depressed thereby by rocking rocker 518 counter-clockwise, stop key 24 will be raised as shown in FIG. 29, and when the stop key is depressed rocker 518 will be restored to the clockwise position of FIGS. 7, 33 thereby retracting divide key 23.

Upon clockwise movement of rocker 518 to restored position, pin 521 thereof will reengage recess 540a at the front edge of plate 540 and this will permit said plate to be restored counterclockwise by spring 541. When plate 540 is restored counterclockwise, pin 539 at its rear will raise the front hooked end of link 538. Furthermore, when rocker 518 is restored clockwise, pin 555 thereof will restore lever 556 counterclockwise and lever 558 connected thereto will also be restored counterclockwise.

As previously described, link 538 is moved toward the rear during the additive corrective registration to backspace pin carriage 2. During the backspacing operations by link 538 prior to retraction of divide key 23, its lowered front hooked end will pass idly below pin 522a of toggle plate 522 (FIG. 29). However, during the backspacing operation of link 538 after retraction of divide key 23, its hooked front end will be in raised position and in its rearward movement, will therefore engage pin 522a and restore plate 522 and divide shaft 512 counter-clockwise from the position of FIG. 33 to the position of FIG. 7.

When plate 522 is restored counterclockwise, link 532 will be moved toward the rear thus rocking link 533 clockwise and moving the vertical section of slot 533b into engagement with pin 536a thereby disconnecting the drive for the overdraft sensing devices. Also when plate 522 is restored, crank 255 will be rocked clockwise to reenable the means which is normally operable to restore pin carriage 2 to its right end position after each machine cycle.

The means automatically operable to retract divide key 23 comprises a crank 593 which is pivotally mounted at the outside of the left side frame (FIG. 12). Crank 593 is normally spring held clockwise (FIG. 12) counter-clockwise (FIGS. 7, 29, 33). A forwardly extending link 594 comprising a pair of yieldable sections is pivotally connected at its rear to crank 593 and is slidably supported at its front by pin and slot connection with the end of a crank 595. Connected with crank 595 is a bail 596 which extends across the machine toward the right and is connected at its right end with a crank 597 as shown in dot-dash lines (FIG. 7) dotted lines (FIG. 12). Crank 595, bail 596 and crank 597 are spring urged clockwise (FIG. 7) counterclockwise (FIG. 12) to engage the rear edge of an upstanding arm of said crank 597 with a pin 84a projecting outwardly from the stop arm 84 of the lowest order actuator rack 80 (FIG. 1). At the upper front edge of link 594 is a lug 594a which is adapted to engage the lower end of lever 558.

A roller 598 (FIGS. 12, 29, 33) is mounted on the outer face of a cam 123 which is fast on main drive shaft 22 exteriorly of gear 584. During the mir-cycle dwell of each cycle of the registering mechanism, roller 598 will engage and rock crank 593 thereby moving link 594 toward the rear. Normally crank 595 is in the counter-clockwise position of FIG. 29 and consequently the front end of link 594 wil be in lowered position. Therefore when link 594 is moved toward the rear, lug 594a thereof will pass idly below the lower end of lever 558 as shown in the lower dot-dash lines of FIG. 29. However, when the lowest order rack 80 (FIG. 1) is moved forwardly in the first half of a registering cycle, pin 84a (FIG. 7) of the associated stop arm 84 will be moved rearwardly thereby permitting crank 595, bail 596 and crank 597 to be rocked counterclockwise (FIG. 12), clockwise (FIG. 29). This will raise lug 594a to the upper dot-dash position of FIG. 29. Consequently as link 594 is moved toward the rear, lug 594a will engage the lower end of lever 558 and restore said lever counterclockwise.

When lever 558 is restored counterclockwise, the slot at its upper end engaging pin 557 of lever 556 will exert a camming action on said pin and thereby restore said lever 556 counterclockwise from the position of FIG. 29 to the position of FIG. 33. Counterclockwise movement of lever 556 by engagement with pin 555 will restore rocker 518 and divide key 23. Following the above described automatic retraction of the divide key, the operation wil continue, as previously described to complete registration of the current digit.

After completion of the registering operations in resonse to retraction of divide key 23, main clutch 18 will not be disengaged but will continue automatically in the total taking operation to print the quotient and then in the total taking operation to print the remainder.

The back spacing operation of pin carriage 2 in response to the final additive corrective registration will usually leave said carriage out of home position. Segmental gear 286 therefore will not be restored and one of the drive gears 276 (FIGS. 1, 13–15) for counter register 266 will be engaged. However, restoration of divide shaft 512 will restore sign control device 308 (FIGS. 2, 16–19) to neutral position thereby disabling counting fingers 304. Registration therefore will not be effected in counter register 266 during the subsequent total taking operations.

In the first of these total taking operations, the reenabled carriage return means will restore pin carriage 2 to home position thereby restoring segmental gear 286. This will restore drum 280 (FIG. 13) to disengage counter drive gears 276 successively from higher to lower orders. Furthermore, when gear segment 286 is restored, pawl 298 will reengage pin 299 as shown in FIG. 14 thereby uncoupling said gear segment 286 from gear segment 283.

With certain combinations of figures constituting the dividend and the divisor, the back spacing operation of pin carriage 2 in response to the final additive corrective registration will return pin carriage 2 to its home position thereby uncoupling gear segments 283, 286. In the backspacing operation prior to the final backspacing operation, means must be provided to prevent uncoupling of segmental gears 283, 286 and prematurely disabling the drive to counter register 266. The premature uncoupling would occur as follows.

In a backspacing operation, carriage 2 is overshifted and then permitted to drop back to the shifted position where it is arrested by escapement 40 (FIGS. 6, 14, 15). In this overshifting movement, pawl 298 would be moved into engagement with pin 299 and the premature uncoupling would be effected. To remedy this, pin 299 is mounted on the previously noted lever 302 which has link connection 607 with backspacing link 538 (FIGS. 12, 29, 32). Therefore in the backspacing operation, lever 302 is rocked clockwise (FIGS. 14, 15). This will move pin 299 clockwise so that it will not be engaged by pawl 298 during the overshift of carriage 2 in this next to the last backspacing operation.

PRINTING THE DIVIDEND, DIVISOR, QUOTIENT AND REMAINDER

(a) Outline of printing operations

The dividend is printed upon entry into accumulator 13 (FIGS. 1, 3, 22) as previously described. During the first registering cycle of the machine in response to depression of divide key 23 (FIGS. 2, 29), the printing mechanism will be afforder its normal operation. This will print the divisor which is set in pin carriage 2 (FIGS. 1, 3, 6). Upon depression of the divide key, adjustments of control mechanisms are effected which will control subsequent operations of the printing mechanisms. These control mechanisms operate to disable the printing mechanism after its operation during the first registering cycle during which the divisor is printed. As a result, the printing mechanism will be disabled during the remaining registering cycles of the division calculation.

Additional adjustments are made in response to depression of division key 23 to control automatic operation of the total taking mechanism at the conclusion of quotient registration. This operation includes first a total taking cycle operable to take a total from counter register 266 thereby printing the quotient and a second cycle operable to take a total from accumulator 13 thereby printing the remainder.

(b) Printing the divisor and disabling the printing mechanism

As previously described, symbol slide 175 is moved toward the rear (FIGS. 20, 21, 23, 24) to release latch 177 which releases bail 166 thereby enabling the printing mechanism. Upon operation of the machine in response to depression of divide key 23 (FIGS. 7, 29) symbol slide 175 will be controlled in its rearward movement to position pin 175b of symbol rack 175a above recess 177c of the lower arm of latch 177. Pin 175b, upon rearward movement from the engaged position of FIG. 20 with nose 177b of latch 177, permits one step of clockwise movement of said latch thereby raising lug 177a from latched position with respect to bail 166 which enables the printing mechanism. However, when pin 175b is moved further rearwardly to position above recess 177c (FIGS. 21, 23) latch 177 will be released for an additional clockwise step of movement. However, at the start of the machine cycle as shown in FIG. 21, latch 177 will be blocked from this additional step of movement by a nose 444a at the lower end of a lever 444 which is in the path of movement of a lug 177d on the upper arm of said latch.

Figure 23:
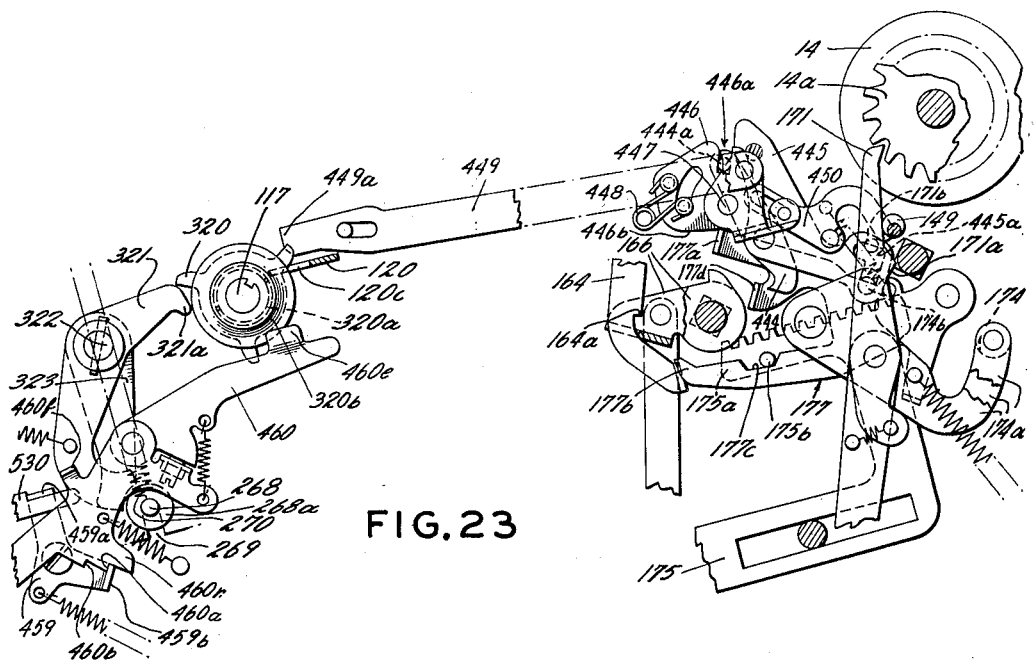

With reference to FIG. 20b, lever 444 is fulcrumed on a swinging arm 445 which has pivotal mounting on the machine framing above the fulcrum of lever 444. Arm 445 extends downwardly and toward the rear inwardly of arm 174a of print hammer restoring bail 174. At its lower rear end, arm 445 is provided with a cam slot 445a including a rearwardly extending upper section and a downwardly extending lower section. Normally a pin 174b extending inwardly from arm 174a engages the front of the upper section of cam slot 445a thereby locating arm 445 in the clockwise direction shown in FIG. 20. During the forward stroke of actuator racks 80, bail 174 will be lowered clockwise to permit operation of the printing hammers. During this movement, pin 174b will be moved to the lower end of cam slot 445a as shown in FIG. 23 and thereby swing arm 445 counterclockwise. During this operation nose 444a will be moved to the rear of a lug 177d of latch 177. This movement of lever 444 is controlled by a connection thereof at its upper end with a toggle plate 446.

Plate 446 has pivotal mounting at 447 on the machine framing and is normally held in the clockwise position shown in FIG. 20 by a toggle spring 448. At the upper edge of plate 446 is a slot 446a which is engaged by a pin 444b at the upper end of lever 444. As lever 444 is rocked counterclockwise to the position shown in FIG. 23, its fulcrum point on said lever will also be moved counterclockwise. Its upper end, however, will be held in fixed pivotal position by pin 444b in engagement with slot 446a of toggle plate 446. Therefore, lever 444 will be rocked counterclockwise about pin 444b thereby moving nose 444a to the rear of lug 177b.

When nose 444a is moved to the rear of lug 177d, latch lever 177 will be released for the second step of clockwise movement. This will bring lug 177d upwardly to the front of nose 444a of lever 444. The printing mechanism will be operated in its usual manner during the mid-cycle dwell of the actuator rack drive thereby printing the divisor. During the return stroke of the actuator rack drive, bail 174 will be restored counterclockwise to reset the print hammers. This will move pin 174b to its normal position at the front end of the upper section of cam slot 445a thereby restoring arm 445 clockwise. During the return clockwise movement of arm 445, lug 177d will be in the clockwise path of nose 444a of lever 444 as shown in FIG. 23. Lever 444, therefore, will be rocked counterclockwise about its fulcrum point on arm 445.

Figure 24:
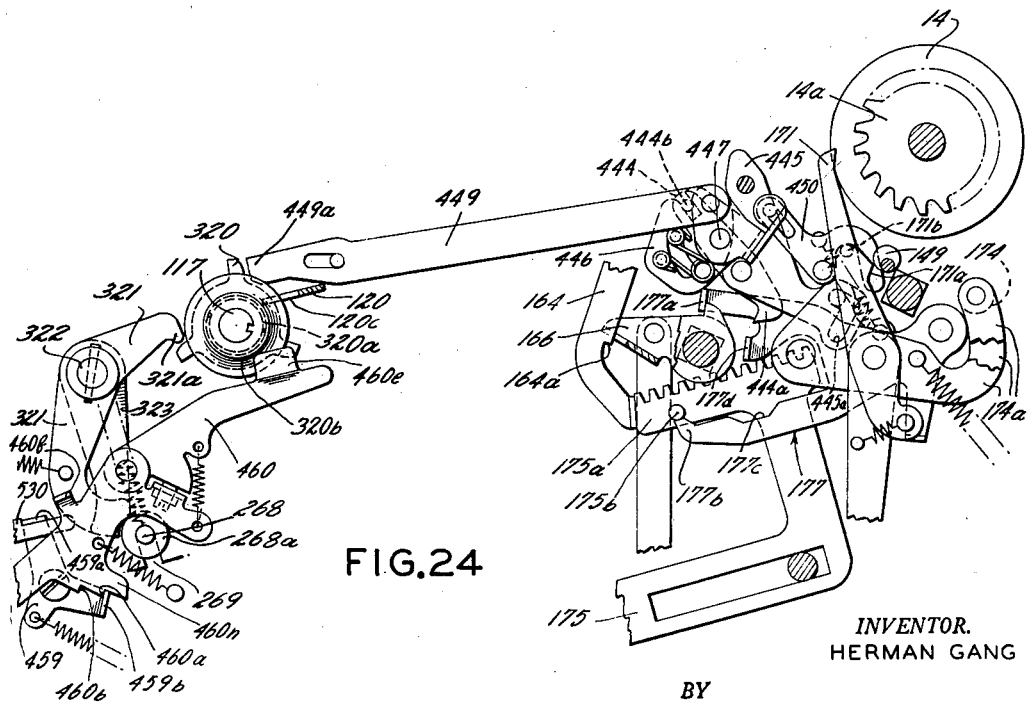

The counterclockwise movement of lever 444, about its fulcrum, will cause pin 444b at its upper end to rock toggle plate 446 counterclockwise beyond the dead center of toggle spring 448 which will complete the counterclockwise movement of said plate to the position of FIG. 24. During the counterclockwise movement of toggle plate 446 its lower cam edge 446b will engage the upper edge of lug 177a thereby rocking and holding latch lever 177 to counterclockwise effective position with respect to bail 166. It will be noted this will release nose 444a of lever 444 from the restraint of lug 177d. However, when this occurs, toggle plate 446 will have been rocked beyond the dead center of toggle spring 448 which will overcome the spring of latch 177. Therefore, when symbol rack 175 is moved toward the rear during subsequent registering operation thereby releasing latch lever 177, edge 446b of toggle plate 446 will prevent lever 177 from movement to release bail 166 and the printing mechanism will remain in disabled position.

The counterclockwise adjustment of toggle plate 446 will also disable the paper feed finger 171. A pin 171b extends inwardly from finger 171 intermediate its upper end and its fulcrum on arm 174a. A lever 450 is fulcrumed on the machine framing between toggle plate 446 and finger 171. One arm of lever 450 extends above and downwardly to the rear of pin 171b. The other arm of the lever extends forwardly and has slot and pin connection with plate 446 adjacent its lower rear edge.

Upon counterclockwise movement of plate 446 to disable the printing mechanism, the slot and pin connection with lever 450 will rock said lever clockwise to the position shown in FIG. 24. Consequently, the right arm of lever 450 will engage the rear of pin 171b. Therefore as finger 171 is moved upwardly, the arm of lever 450 will prevent the normal clockwise movement of said arm to engage ratchet wheel 14a of platen 14.

A further adjustment of mechanism in connection with the subsequent total taking operation is effected upon counterclockwise movement of toggle plate 446 to latching position with respect to lever 177. A forwardly extending arm 449 (FIGS. 20, 21, 23, 24) has pivotal mounting at its rear end on plate 446 above the pivotal mounting of said plate. The forward end of arm 449 is supported by slot and pin mounting and terminates in a nose 449a which is operable in connection with the lobes of cam wheel 320. Normally, nose 449a is inwardly of the vertical plane of cam wheel 320 and to the rear of the rotary path of movement of the lobes of said cam wheel (FIGS. 20, 21, 23). However, upon counterclockwise adjustment of toggle plate 446 (FIGS. 24), arm 449 will be moved forwardly and immediately adjacent the rotary path of movement of the lobes of cam 320 when the machine is in normal full cycle position. However, at this time, cam wheel 320 will be outwardly from the vertical plane of nose 449a and its lobes will therefore be moved idly with respect to said nose as shaft 117 and said cam wheel are stepped clockwise.

(c) Printing the quotient and remainder

It will be recalled that when division shaft 512 (FIGS. 20, 20a, 21, 25) is rocked clockwise upon depression of divide key 23 (FIGS. 7, 29), arm 525 fast thereon rocks crank 143 clockwise thereby moving add-subtract slide 144 rearwardly to subtract position to initiate the division calculation. Furthermore, a trip arm 530 mounted on arm 525 is moved forwardly and a shoulder 530a on the upper edge of said arm 530 is engaged with lug 459a of crank 459 as shown in FIG. 21. Latch lever 459 is spring biased counterclockwise and normally a lug 459b at the end of a rearwardly extending arm thereof is engaged by a rear shoulder 460a (FIGS. 20, 21, 23, 24) at the lower edge of a forwardly extending arm of a total repeat lever 460 which is fulcrumed on the machine right side frame.

Lever 460 includes a rearwardly extending arm which, at its end, engages a guide slot in a suitable bracket 461. The rear arm of lever 460 is adjustable with respect to the forward arm for the purpose of accurately timing the lever operation. The two arms of the lever, however, after initial adjustment are maintained in fixed relationship. Therefore, with respect to its operation, lever 460 may be considered a unitary structure.

Lever 460 is spring biased counterclockwise and normally is restrained from such movement by its shoulder 460a in engagement with lug 459b (FIGS. 20, 21, 23, 24). Forwardly of shoulder 460a is a second shoulder 460b which also is adapted for engagement with lug 459b of latch lever 459 as later described. Intermediate its front end and its shoulder 460b, lever 460 is provided with a locating recess 460c which normally engages a pin 196a of crank 196 of total slide 195. Forwardly of recess 460c, lever 460 turns upwardly and thereby provides a blocking edge 460d.

A cam ear 460e extends upwardly and is inclined outwardly from the rear arm of lever 460 adjacent its end. Normally the inner operating face of ear 460e is spaced below the outwardly projecting cam face of a cam plate 320b integral with cam wheel 320 as shown in FIGS. 20, 21, 23, 24, 27.

Restoring devices, operable in connection with the total taking mechanism, include a forwardly extending link 212 connected at its forward end to an upstanding arm 211 which is fast on a shaft 186 (FIGS. 20, 21). During the mid-cycle dwell of each cycle of actuator racks 80, link 212 is moved toward the rear and restored during the return stroke of the racks. This operation rocks arm 211 and shaft 186 clockwise from the position of FIGS. 20, 21 to the position of FIG. 25 and return. The rocking movement of arm 211 is utilized to effect operation of a finger 470 which is pivotally mounted on said arm and which is operable in connection with shoulder 460a of lever 460 and with a nose 460n to the rear of the shoulder.

Finger 470 extends forwardly and is spring urged clockwise into engagement with the end of link 212 (FIGS. 20, 21) which acts as a limit stop. The front operating end of finger 470 is normally located below and intermediate shoulder 460a and nose 460n. Normally, when arm 211 is rocked clockwise, the end of finger 470 will engage the underside of nose 460n adjacent its rear and will thereupon yield counterclockwise. When arm 211 is restored counterclockwise, finger 470 will engage the rear of nose 460n thereby rocking lever 460 slightly clockwise. Then upon further movement, the finger will release lever 460 as said finger is moved below nose 460n thereof.

Upon counterclockwise movement of division shaft 512 and arm 525 to restored position, shoulder 530a of trip arm 530 will be effective to rock crank 459 clockwise thereby moving lug 459b from engagement with shoulder 460a of lever 460 thereby releasing said lever. Lever 460 therefore will be spring rocked counterclockwise to engage the rear of its nose 460n with a suitable limit pin as shown in FIG. 25.

The counterclockwise movement of lever 460 will effect the following operations and adjustments of the parts. Edge 460d will be brought into engagement with pin 196a of crank 196 of total slide 195. This will rock and hold crank 196 clockwise thereby moving and holding total slide 195 in rear operated position (FIG. 25). A lug 460f of lever 460 will be brought into engagement with and depress the end of trip arm 530 thereby moving shoulder 530a from engagement with lug 459a. This will release crank 459 which will then be spring rocked counterclockwise to engage its lug 459b with the under edge of lever 460 forwardly of shoulder 460b. During substantially the last half of the counterclockwise movement of lever 460, cam ear 460e will engage the cam face of plate 320b (also FIGS. 27, 28) thereby moving cam wheel 320 inwardly on shaft 117 to the vertical plane of nose 321a of lever 321 and of nose 449a of link 449.

In addition to the foregoing operations, means is provided to prevent add-subtract slide 144 (FIGS. 20a, 25) from being restored from subtract position when division shaft 512 is restored counterclockwise (FIG. 25). Thus with total slide 195 adjusted to active position when division shaft 512 is restored, main clutch 18 will not be disengaged at the end of the division calculation, but the machine will continue in the total taking operations. The maintenance of add-subtract slide 144 in subtract position is effected as follows.

Loosely mounted on division shaft 512 adjacent to and to the right (FIGS. 9, 20a, 21, 25) is a depending arm 600. A second arm 601 similar to arm 600 is loosely mounted on shaft 512 to the left (FIG. 9) of arm 600. A bail 602 connects arms 600, 601 at their rear and has an upper face which is adjacent and normally parallel with the lower face of lug 525a.

Fast with the forward end of lever 460 and spaced leftwardly therefrom is a forwardly extending arm 603 (FIGS. 20, 20a, 21, 25). Arm 603 is contoured according to the forward end of arm 460 and therefore is provided with a recess 603c and a holding edge 603d. At the lower end of arm 600 is a pin 604 which normally engages recess 603c (FIG. 20a).

As previously described, a link 526 extends toward the rear (FIGS. 4, 5, 20a) from arm 525 and is operable to adjust the double stroke registration control devices. Link 526 is connected to arm 525 by a rightwardly extending pin 605 which has spring connection with arm 600 to bias said arm counterclockwise. Pin 605 is therefore normally engaged by the rear edge of arm 600.

When division shaft 512 and arm 525 are rocked clockwise in response to depression of divide key 23, lug 525a engages edge 143a of crank 143 thereby rocking and holding said crank and add-subtract slide 144 in subtract position as has been described. Simultaneously with this operation, pin 605 will rock arms 600, 601 and bail 602 with arm 525 (FIG. 21). Bail 602 therefore will engage edge 143a (FIG. 20a) of crank 143 simultaneously with lug 525a. Furthermore, in the clockwise movement of arm 600, pin 604 will be removed from engagement with recess 603c of arm 603 and moved forwardly thereof.

With the parts adjusted as above described, the counterclockwise adjustment of lever 460 (FIG. 25) in response to restoring of divide shaft 512 and lever 525 will adjust arm 603 fast therewith to like counterclockwise extent. This will engage holding edge 603d with pin 604 thereby holding arms 600, 601 and bail 602 in clockwise adjusted position. Bail 602 therefore will be maintained in engagement with edge 143a thereby holding crank 143 rocked and slide 144 in subtract position (FIG. 25). Consequently at the end of the current registering operation, main clutch 18 will not be disengaged and the machine will immediately start in the total taking operations.

During the total taking operations, total key 6 will not be depressed and therefore the usual stop control will not be afforded symbol plate 179 (FIG. 9) to control the symbol printing operation. To provide this control, arm 601 has a forwardly extending nose 601a (FIG. 20a) at its front lower edge. When arms 600, 601 are held rocked clockwise, nose 601a is in the path of movement of a lug 606 (FIG. 9) on symbol plate 179. Lug 606 will be moved into engagement with nose 601a in the total taking operations thereby permitting the same leftward extent of movement as is afforded by the stem of depressed total key 6 in the usual total taking operation.

Upon adjustment of cam wheel 320 to the plane of nose 321a and of nose 449a, its engagement with shoulder 120c (FIG. 5) will adjust slide 120 from subtractive to neutral position, and therefore the ensuing machine cycle will be effective to take a total from counter register 266 in which the quotient is registered. The total taking operation with cam wheel 320 adjusted to effective position, is fully described in the section titled "Total Taking." Provision, however, must be made to reenable the printing and paper feed mechanism which, upon initiation of this total taking operation, will be disabled by edge 446b of toggle plate 446 in engagement with lug 177a of latch lever 177 (FIG. 24).

Upon initiation of the total taking operation for counter register 266, a lobe of cam wheel 320 will be immediately adjacent the front of nose 449a of arm 449 (FIG. 24). Therefore during the first step of cam wheel 320, which occurs during the initial dwell of the actuator rack drive, nose 449a will be engaged by a lobe of cam wheel 320 and arm 449 will be restored to the rear (FIG. 25). This will rotate toggle plate 446 clockwise to a normal position of FIG. 20 thereby releasing latch lever 177 and lever 450 to enable the printing and paper feed mechanism.

Lever 460 will be restored one step of movement from the position of FIG. 25 by finger 470 during the total taking cycle for counter register 266. This will control a second machine cycle for a total taking operation for accumulator register 13 to print a remainder if there is one. Lever 460 is restored as follows.

When finger 470 is rocked clockwise (FIG. 25) during the mid-cycle dwell of the actuator rack drive of the total taking cycle for counter register 266, its operating end will be brought into engagement with the under edge of lever 460 to the rear of shoulder 460a. As finger 470 is restored during the return stroke of the actuator racks, its operating end will engage shoulder 460a thereby rocking lever 460 clockwise to bring its shoulder 460b slightly to the front of lug 459b of latch lever 459. As finger 470 completes its counterclockwise movement, it will be moved downwardly from engagement with shoulder 460a and lug 459b will engage shoulder 460b to restrain lever 460 in an intermediate position (not shown) between its full operated and normal position.

Upon clockwise movement of lever 460 to intermediate position, cam ear 460e will be disengaged from the cam face of plate 320b (FIG. 27) thereby permitting cam wheel 320 to be restored outwardly by spring 320a from the plane of nose 321a and nose 449a (FIGS. 20, 21, 23, 24). Also, cam wheel 320 will release sign control slide 120 (FIG. 5) which then will be moved to the subtract position to which it is biased by the setting of add-subtract slide 144. The movement of lever 460 to intermediate position, however, will not disengage blocking edges 460d and 603d from engagement with pins 196a, 604 respectively. Total slide 195 and add-subtract slide 144 therefore will be held in rear operated position. As a result, main clutch 18 will not be disengaged at the end of the total taking cycle for counter register 266, but will continue in a second total taking cycle of operation. During this operation, the total taking mechanism will be afforded its usual operation, and therefore a total will be taken from accumulator register 13.

When finger 470 is rocked clockwise, during the mid-cycle dwell of the total taking cycle for accumulator 13, its operating end will be brought to the rear of nose 460n of lever 460 which has been restored one step of movement. As finger 470 is restored during the return stroke of actuator racks 80, its operating end will engage nose 460n thereby rocking lever 460 clockwise to bring its shoulder 460a slightly to the front of lug 459b of latch lever 459. As finger 470 completes its counterclockwise movement, it will be moved downwardly from engagement with nose 460n and lug 459b will engage shoulder 460a to restrain lever 460 in normal clockwise position (FIG. 20).

When lever 460 is restored to its normal clockwise position blocking edges 460d and 603d will be removed from engagement with pins 196a and 604 respectively. Total slide 195 and add-subtract slide 144 therefore will be restored and clutch 18 will be disengaged at the end of the cycle.

I claim:

1. In a calculating machine having a register for receiving a dividend, reciprocatory cyclically operable actuating means for said register, adjustable means for effecting relative adjustment between said register and said actuating means for idle operation of said actuating means or for additive or subtractive registration during one or both strokes of each cycle of operation thereof, and selection means for receiving a divisor and for controlling the extent of the excursions of said actuating means; division control mechanism including, means operable to initiate operation of said actuating means and to control said adjustable means for subtractive registration by said actuating means during both strokes of each cycle of operation, means operable to detect an overdraft of an amount in said register, and means operable in response to operation of said detection means to suspend subtractive operation of said actuating means at the end of the current stroke of registering operation.

2. In a calculating machine having a register for receiving a dividend, reciprocatory cyclically operable actuating means for said register, adjustable means for effecting relative adjustment between said register and said actuating means for idle operation of said actuating means or for additive or subtractive registration during one or both strokes of each cycle of operation thereof, and selection means for receiving a divisor and for controlling the extent of the excursions of said actuating means; division control mechanism including, means operable to initiate operation of said actuating means and to control said adjustable means for subtractive registration by said actuating means during both strokes of each cycle of operation, means operable to detect change in sign of an amount in said register, and means operable in response to operation of said detection means upon detection of a sign change for controlling said adjustable means for operation of said actuating means in an additive sense during the following stroke of operation.

3. The invention according to claim 2; wherein said means operable in response to operation of said detection means is operable to control said adjustable means for operation of said actuating means idly and in an additive sense during the following respective two strokes of operation.

4. The invention according to claim 3; wherein said following two strokes of operation comprises the following cycle of operation.

5. In a calculating machine having a register for receiving a dividend, reciprocatory cyclically operable actuating means for said register, adjustable means for effecting relative adjustment between said register and said actuating means for idle operation of said actuating means or for additive or subtractive registration during one or both strokes of each cycle of operation thereof, and selection means for receiving a divisor and for controlling the extent of the excursions of said actuating means; division control mechanism including, means operable to initiate operation of said actuating means and to control said adjustable means for subtractive registration by said actuating means during both strokes of each cycle of operation, means operable to detect an overdraft of an amount in said register, and means operable in response to detection of an overdraft to control said adjustable means for additive registration by said actuating means during the following stroke of operation.

6. The invention according to claim 5; wherein said means operable in response to detection of an overdraft is alternatively operable by means responsive to detection of said overdraft during the last half of the cycle to control said adjustable means for idle operation of said actuating means during one of the following two strokes of operation thereof and for additive registration during the other of said two following strokes.

7. In a calculating machine having a register for receiving a dividend, reciprocatory cyclically operable actuating means for said register, adjustable means for effecting relative adjustment between said register and said actuating means for idle operation of said actuating means or for additive or subtractive registration during one or both strokes of each cycle of operation thereof, control devices settable to control adjustment of said adjustable means, and selection means for receiving a divisor and for controlling the extent of the excursions of said actuating means; division control mechanism including, primary setting means operable to set said control devices to control adjustment of said adjustable means for subtractive registering operation of said actuating means during both strokes of each cycle of operation, means for initiating operation of said actuating means and said primary setting means, means operable to detect change in the sign of an amount in said register, and secondary setting means operable in response to operation of said detection means to suspend the setting effected by said primary setting means thereby changing the setting of said control devices to control adjustment of said adjustable means for the following stroke of operation of said actuating means.

8. The invention according to claim 7; wherein said primary setting means includes a resilient connection and said secondary setting means is operable to set said control devices against the urge of said resilient connection.

9. In a calculating machine having a register for receiving a dividend, reciprocatory cyclically operable actuating means for said register, adjustable means for effecting relative adjustment between said register and said actuating means for idle operation of said actuating means or for additive or subtractive registration during one or both strokes of each cycle of operation thereof, control devices settable to control adjustment of said adjustable means, and selection means for receiving a divisor and for controlling the extent of the excursions of said actuating means; division control mechanism including, primary setting means including a resilient connection operable to set said control devices to control adjustment of said adjustable means for subtractive registration of said actuating means during both strokes of each cycle of operation, means for initiating operation of said actuating means and said primary setting means, means operable to detect an overdraft of said register, and secondary setting means operable in response to operation of said detection means to suspend the setting effected by said primary setting means thereby changing the setting of said control devices to control adjustment of said adjustable means for additive operation during the following stroke of said actuating means, or for idle operation and additive operation respectively during the following two strokes of said actuating means.

10. In a calculating machine having a register for receiving a dividend, reciprocatory cyclically operable actuating means for said register, adjustable means for effecting relative adjustment between said register and said actuating means for idle operation of said actuating means or for additive or subtractive registration during one or both strokes of each cycle of operation thereof, control devices settable to control adjustment of said adjustable means, and selection means for receiving a divisor and for controlling the extent of the excursions of said actuating means; division control mechanism including, primary setting means including a resilient connection operable to set said control devices to control adjustment of said adjustable means for subtractive registration of said actuating means during both strokes of each cycle of operation, means for initiating operation of said actuating means and said primary setting means, secondary setting means including a setting train and a normally disabled cam adjustable to position to operate said setting train to set said control devices to control adjustment of said adjustable means for idle and for additive operation respectively of said actuating means during one and the other stroke of each cycle, means for detecting an overdraft of said register and means operable in response to operation of said detection means to enable said cam means.

References Cited in the file of this patent
UNITED STATES PATENTS

| | | |
|---|---|---|
| 1,964,478 | Overbury | June 26, 1934 |
| 2,237,881 | Landsiedel | Apr. 8, 1941 |
| 2,297,243 | Pott | Sept. 29, 1942 |
| 2,308,292 | Marquess | Jan. 12, 1943 |
| 2,668,011 | Anderson | Feb. 2, 1954 |
| 2,681,765 | Hopkins | June 22, 1954 |
| 2,688,439 | Landsiedel | Sept. 7, 1954 |
| 2,773,646 | Mathi | Dec. 11, 1956 |
| 2,834,542 | Sundstrand | May 13, 1958 |

UNITED STATES PATENT OFFICE
CERTIFICATE OF CORRECTION

Patent No. 3,015,436                 January 2, 1962

Herman Gang

It is hereby certified that error appears in the above numbered patent requiring correction and that the said Letters Patent should read as corrected below.

Column 4, line 33, strike out "a"; line 48, after "28a" insert a comma; column 14, line 31, strike out "a"; column 15, line 52, strike out "a"; column 20, line 13, for "21" read -- 29 --; column 24, line 27, for "povitally" read -- pivotally --; column 27, line 6, strike out "by"; line 62, for "mir-cycle" read -- mid-cycle --; column 28, line 70, for "afforder" read -- afforded --; column 30, line 58, for "FIGS." read -- FIG. --.

Signed and sealed this 26th day of March 1963.

(SEAL)
Attest:

ESTON G. JOHNSON                 DAVID L. LADD

Attesting Officer                  Commissioner of Patents